United States Patent
Kakuta et al.

(10) Patent No.: US 6,577,579 B1
(45) Date of Patent: Jun. 10, 2003

(54) DISC DRIVE APPARATUS OF SLOT LOADING TYPE

(75) Inventors: Tsuyoshi Kakuta, Kurume (JP); Yoshinobu Soeda, Onojo (JP); Junichi Mutoh, Munakata (JP); Hideru Goto, Fukuoka (JP); Nobuo Jikuya, Chikushino (JP); Minoru Nagata, Fukuoka (JP); Fuminobu Furukawa, Onojo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/506,923

(22) Filed: Feb. 18, 2000

(30) Foreign Application Priority Data

| Feb. 23, 1999 | (JP) | 11-044400 |
|---|---|---|
| Feb. 23, 1999 | (JP) | 11-044401 |
| Feb. 24, 1999 | (JP) | 11-046239 |
| Feb. 24, 1999 | (JP) | 11-046240 |
| Feb. 25, 1999 | (JP) | 11-047632 |
| Feb. 25, 1999 | (JP) | 11-047633 |
| Feb. 25, 1999 | (JP) | 11-047634 |
| Feb. 26, 1999 | (JP) | 11-050013 |
| May 13, 1999 | (JP) | 11-132275 |
| Jun. 1, 1999 | (JP) | 11-153291 |

(51) Int. Cl.$^7$ .......................... G11B 17/04; G11B 19/02
(52) U.S. Cl. .................................... 369/77.1
(58) Field of Search ............... 369/77.1, 75.1, 369/77.2, 75.2

(56) References Cited

U.S. PATENT DOCUMENTS

| 5,010,484 A | * | 4/1991 | Kobayashi et al. | 369/77.2 |
| 5,173,893 A | * | 12/1992 | Morikawa et al. | 369/77.1 |
| 5,204,849 A | * | 4/1993 | Yamada et al. | 369/75.2 |
| 6,016,299 A | * | 1/2000 | Ishige | 369/75.2 |
| 6,288,982 B1 | * | 9/2001 | Kato | 369/30.36 |
| 6,330,216 B1 | * | 12/2001 | Nishimura et al. | 369/77.1 |

FOREIGN PATENT DOCUMENTS

| JP | 2585176 | 9/1993 |
| JP | 6290529 | 10/1994 |
| JP | 7254199 | 10/1995 |

* cited by examiner

Primary Examiner—William Korzuch
Assistant Examiner—Angel Castro
(74) Attorney, Agent, or Firm—Stevens, Davis, Miller & Mosher, LLP

(57) ABSTRACT

The invention provides a disc drive apparatus which is suitable for making the apparatus compact, light and thin and make it possible to automatically mount and discharge the disc. The disc drive apparatus has pick-up means and transfer means, and the transfer means has medium driving means, synchronous driving means and positioning means which is brought into contact with an outer peripheral edge of the disc. Accordingly, the disc can be transferred in a direction of a disc surface and can be positioned by the positioning means.

16 Claims, 26 Drawing Sheets

VIEW AS SEEN FROM ARROW V

VIEW AS SEEN FROM ARROW W

CENTER HOLE OF DISC

STEP 1

STEP 2

ENLARGED VIEW

DISC DRIVE APPARATUS OF SLOT LOADING TYPE

BACKGROUND OF THE INVENTION

1. Field of the Invention

The present invention relates to a disc drive apparatus which rotates a disc recording medium so as to reproduce a signal, and particularly to a disc drive apparatus which transfers and mounts a disc recording medium to mounting means so as to rotate. More particularly, the present invention relates to a mechanism which transfers a disc recording medium from a supply position thereof to a position for mounting it to rotating means thereof (particularly a spindle motor) at a time of rotating the disc recording medium.

In this case, the disc recording medium indicates a concentric disc-shaped medium having a central hole, and it is exemplified by a MO, PD, CD, CD-ROM, CD-R, CD-RW, DVD-ROM, DVD-RAM and the like as well as an old EP recording disc. The disc is simply used for totally calling them. Further, as far as it is not particularly limited, the disc indicates a bare disc which is not received in a jacket.

2. Description of the Related Art

A description will be given of a conventional disc mounting method. A mechanism for transferring the disc means a mechanism which supplies the disc to the disc drive apparatus and transfers the disc from the supply position to a position for mounting to the rotating means. The transfer system is exemplified by the following three kinds which have been conventionally employed. Firstly, for example, as disclosed in Japanese Patent Unexamined Publication No. 6-290529, there is a structure which takes out a bare disc from a stock area for the disc so as to transfer, which is generally called as a changer.

Secondly, there is a structure in which an operator himself or herself mounts and fixes the disc to the rotating means so as to transfer to the position for mounting to the rotating means. This structure is called as a tray system, and corresponds to a structure in which the operator mounts the disc to a turn table and a whole of the rotating means including the turn table is transferred to the position of rotation, for example, as disclosed in Japanese Patent Unexamined Publication No. 7-254199.

Thirdly, there is a structure which receives a disc in a jacket, transfers the jacket to the rotating means and thereafter fixes and rotates the disc within the jacket. For example, as disclosed in Japanese Patent No. 2585176, the structure is made such as to be mounted to a reproducing apparatus by a transfer operation by means of the transfer mechanism and a vertical movement by means of a motor.

Each of the transfer systems mentioned above requires a vertically moving mechanism for moving the fixing mechanism in a direction of transferring the disc and a vertical direction, so that it required a complex moving mechanism and a space for the movement. Further, it needs the moving mechanism and the space for the movement, because the operator moves the rotating means for pulling out it to an easily operable position for the purpose that the operator mounts the disc to the rotating means.

However, a computer apparatus is advanced to be made compact and light, and in a disc drive apparatus used for an external recording apparatus for the computer apparatus, a compact size, a light weight and a thin size are required. Accordingly, the pulling-out and moving mechanism and the vertical moving mechanism are obstacle for making the apparatus to thin type, so that there is a limit to making the thin type apparatus. Further, in order to provide a more comfortable computer operability, there is required a disc drive apparatus in which it is not necessary for the operator to mount and operate.

SUMMARY OF THE INVENTION

An object of the present invention is to provide a disc drive apparatus having a structure suitable for making the apparatus compact, light and thin, in which a pulling-out and moving mechanism and a vertical moving mechanism are not required, whereby a whole of the apparatus is made thin.

In addition, another object of the present invention is to provide a disc drive apparatus in which an outer shape of the disc drive apparatus is made compact to the substantially same shape as a regular square which is circumscribed with an outer periphery of a disc, thereby being constructed in a thin shape and capable of being mounted to a note-book type computer.

Further, the other object of the present invention is to provide a disc drive apparatus which can automatically mount and discharge a disc and requires no mounting operation by an operator.

Still further, the other object of the present invention is to provide a disc drive apparatus which can prevent a disc from being erroneously inserted.

The present invention is made for solving the problems mentioned above, and in accordance with the present invention, there is provided a disc drive apparatus comprising:

pick-up means which mounts, fixes and release a disc and rotates the disc so as to reproduce a signal from the disc; and disc transfer means which transfers the disc supplied by an operator to the pick-up means in a direction of a disc surface, wherein the disc transfer means has medium driving means which is formed in a thin flat shape and swings in the direction of the disc surface so as to transfer and drive the disc, and synchronous driving means which drives the medium driving means, and positioning means which is brought into contact with an outer peripheral edge of the disc.

The structure is made such as to transfer the disc in the direction of the disc surface by the disc transfer means constructed in the manner mentioned above and to position the disc by the positioning means.

Accordingly, in accordance with the disc drive apparatus of the present invention, since the disc is only transferred from the disc supply position to the position for rotating the disc along the disc surface, the pulling-out and moving mechanism and the vertical moving mechanism are not required and it is possible to make the apparatus thin and compact. Further, since the transferred disc is previously aligned with the pick-up means by the positioning means when the pick-up means mounts, fixes and releases the disc, the pick-up means can securely mount, fix and release the disc, so that a note-book type personal computer employing the disc drive apparatus in accordance with the present invention can be continuously used without being limited in a used aspect (for example, an incline is inhibited or the like).

Further, since it is not necessary for the operator to mount, fix and release the disc by himself or herself, it is possible to obtain the disc drive apparatus having a more comfortable operability.

Then, the structure is made such that a thickness of a whole of the apparatus is set to a level equal to or less than 12.7 mm due to the disc transfer means constituted by the guiding means, the medium driving means and the synchronous driving means.

In addition, since the medium driving means is driven by the synchronous driving means which is formed so as to have a diameter equal to or less than an outer diameter of the disc and formed in a thin disc shape, it is possible to make an outer shape of the disc drive apparatus compact to a level substantially equivalent to a regular square which is circumscribed with an outer periphery of the disc, so that it is possible to provide a compact disc drive apparatus which can be also mounted to a note-book type computer.

Further, there can be provided a disc drive apparatus having supply port closing means which prevents the disc from being supplied, thereby preventing the discs from being doubly inserted.

DESCRIPTION OF THE PREFERRED EMBODIMENTS

A description will be given below of an embodiment in accordance with the present invention with reference to the accompanying drawings.

Figure 1:
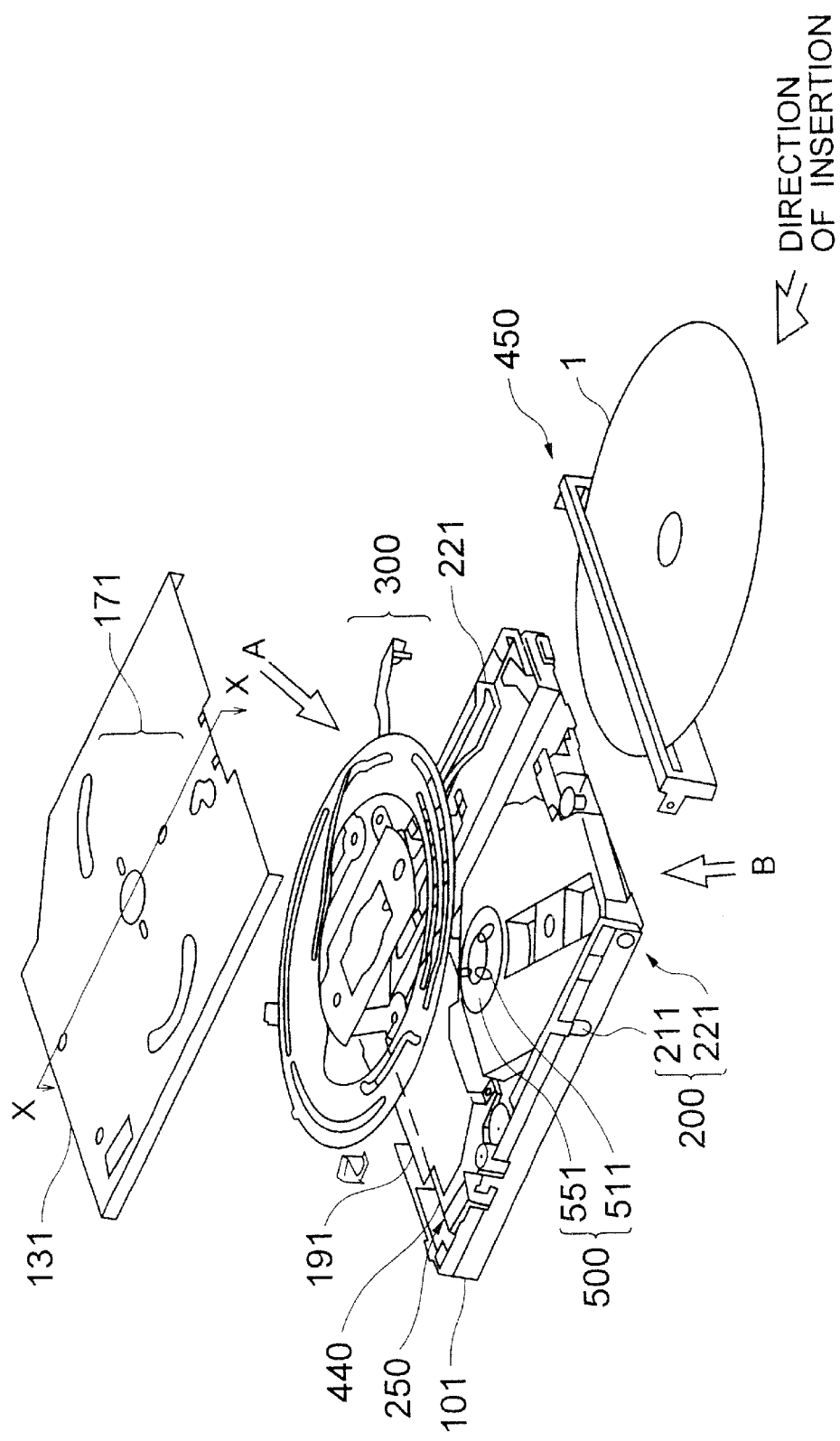
FIG. 1 is an exploded perspective view of a disc drive apparatus in accordance with an embodiment of the present invention.

FIG. 1 is an exploded perspective view of a disc drive apparatus in accordance with an embodiment of the present invention. On the basis of FIG. 1, a whole structure of a disc drive apparatus in accordance with the present invention will be described. At first, a casing 100 is constituted by only two parts comprising a lower cover 101 and an upper cover 131. In the lower cover 101, there are arranged guiding means 200 which guides a disc 1, drive means 250, a pick-up module 500 which includes rotating means for rotating the disc 1 so as to rotate the disc and reproduce a signal, a control portion 440 which controls a whole of the apparatus, and a protecting cover 191 for protecting an inner portion. On the other hand, a pivot mechanism 171 for axially supporting the drive means 250 is provided in the upper cover 131, and transfer means 300 for receiving and discharging the disc 1 is rotatably provided in the pivot mechanism 171. The drive means 250 of the lower cover 101 is a drive source for rotating the transfer means 300. After combining the lower cover 101 with the upper cover 131, inserting port means 450 is mounted. In this case, detecting means for detecting a position of operation of each of the mechanisms mentioned above, that is, a position of the disc will be described in details of each of the mechanisms.

Figure 2:
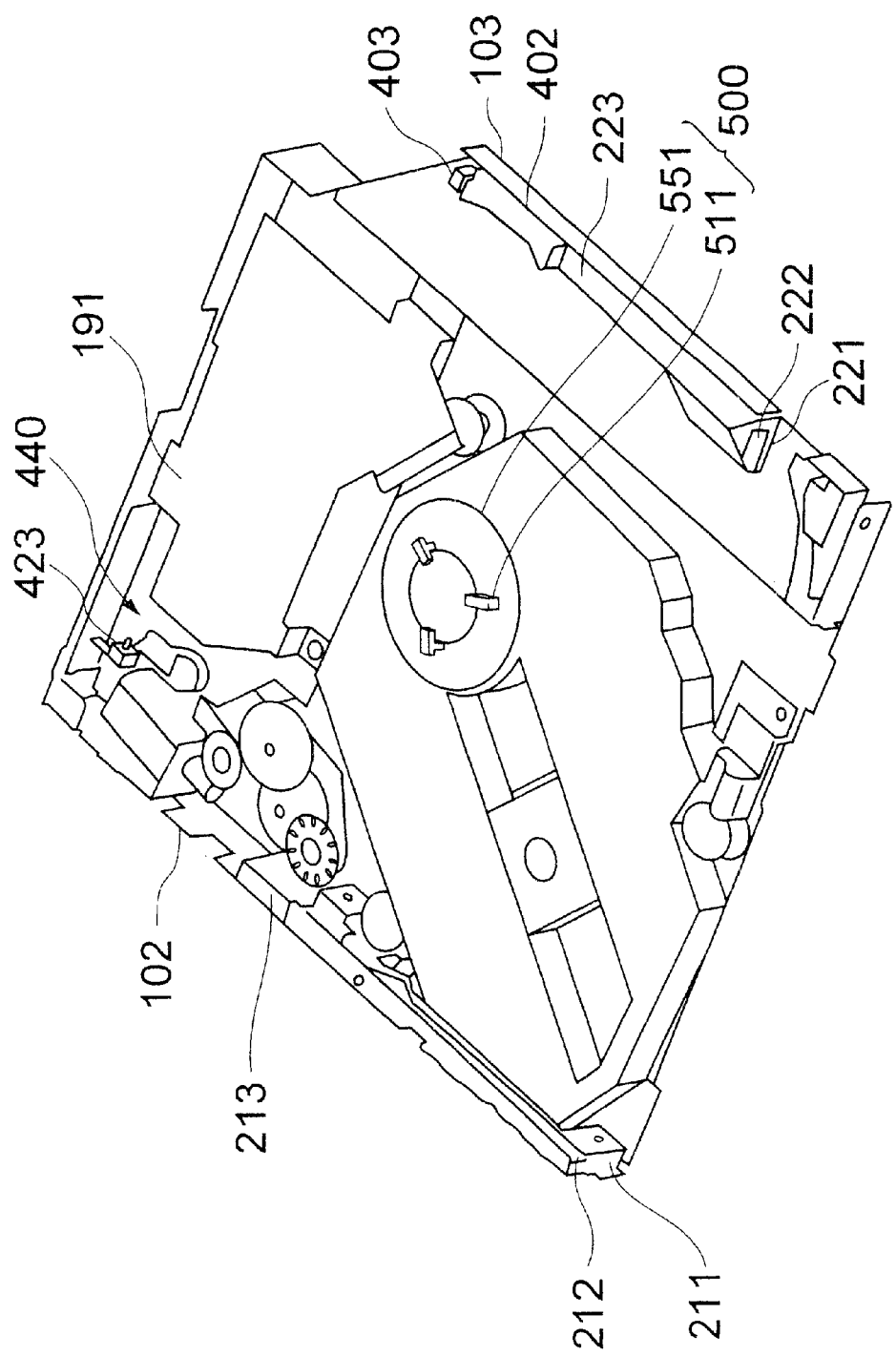
FIG. 2 is a perspective view of a lower cover in FIG. 1 as seen from an arrow A.

Next, details of each of the mechanisms will be described. FIG. 2 is a perspective view of the lower cover in FIG. 1 as seen from an arrow A. In FIGS. 1 and 2, the lower cover 101 is formed in a box shape opened in two directions. In an upper portion on the sheet in the drawing, the upper cover 131 is mounted so as to form a space corresponding to a passage for inserting the disc 1, and the transfer means 300 and the pick-up module 500 are mounted. Further, an opening portion in a front direction on the sheet in the drawing is an operating surface to which the operator inserts and discharges the disc with respect.

A guide rail L211 and a guide rail R221 are fixed to side walls L102 and R103 which are stood from left and right portions on the sheet in the lower cover 101. The guide rail L211 and the guide rail R221 are formed in a square stick member having a recessed cross section, and grooves L212 and R222 having a recessed cross sectional shape constitute a passage for the disc 1. That is, a bare disc 1 without using a jacket (not shown) moves forward in a direction of a disc surface thereof to the disc drive apparatus along the guides L212 and R222. A length of the guide rails L211 and R221 is extended to a position necessary for mounting to the pick-up module 500. Further, terminal end portions L213 and R223 of the guide rails L211 and R221 cut the lower portions of the grooves L212 and R222 so as to align with an outer shape of the disc 1, and the terminal end portions L213 and R223 of the grooves L212 and R222 are formed in a smooth inclined surface so as to be easily attached to and detached from the pick-up module 500.

Figure 3:
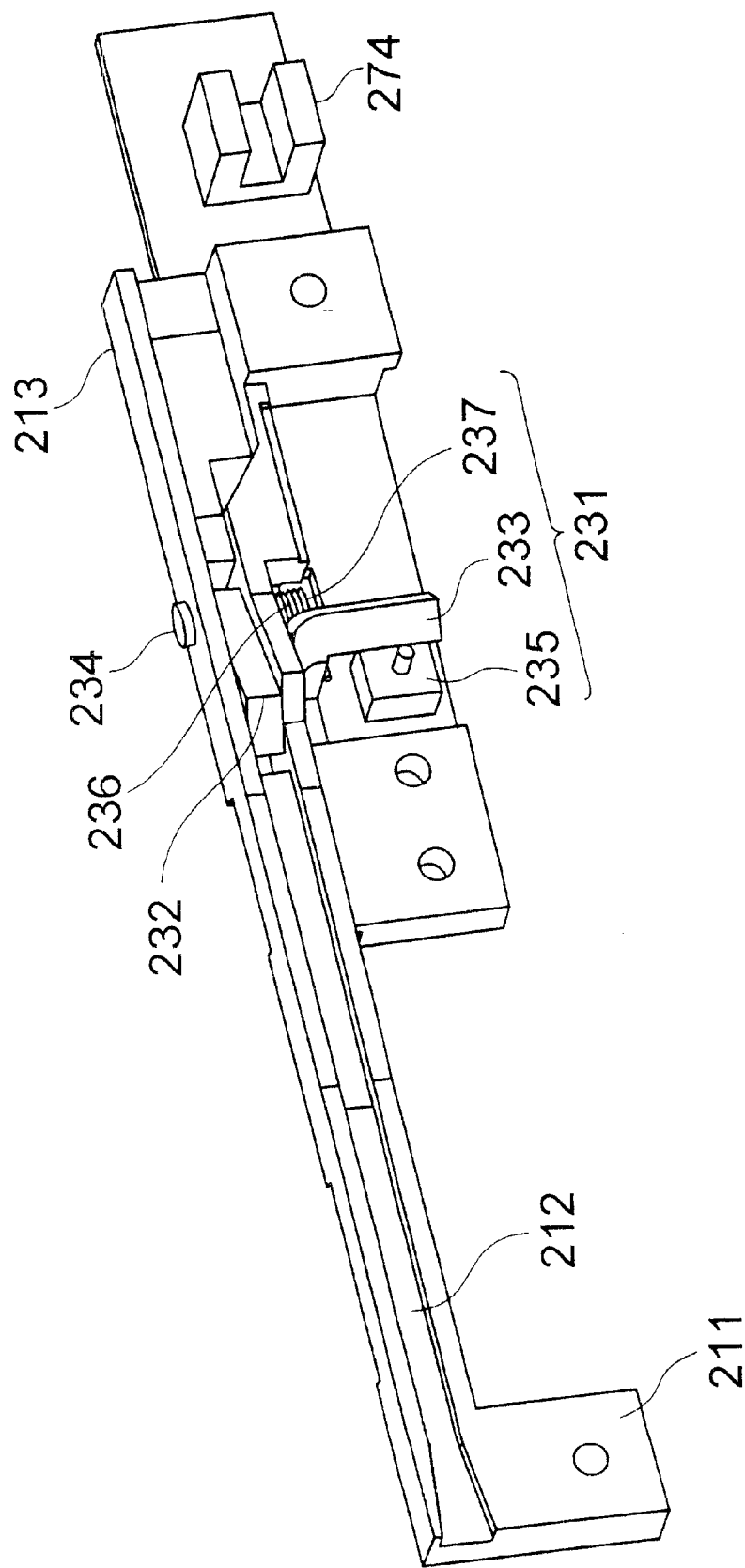
FIG. 3 is a perspective view of a whole of a guide rail L.

The operator inserts the disc 1 from the operating surface. At this time, in order to detect that the disc is inserted to a position which is necessary for transferring the disc and sufficient for a safety of the operator's finger, an insertion detecting sensor 231 is arranged in the guide rail L211. FIG. 3 is a perspective view of a whole of the guide rail L. The insertion detecting sensor 231 is constituted by a passage actuator 232 which detects the disc 1, a rotating pin 234 of the passage actuator 232 and an insertion detecting switch 235. The passage actuator 232 is arranged in the groove 212. The passage actuator 232 is rotatably mounted to the groove 212 by the rotating pin 234. The rotating pin 234 is mounted to the guide rail 211 by a stop ring 237. Further, the passage actuator 232 is urged in a direction of projecting to the groove 212 by a rotating spring 236, thereby detecting the disc 1 and rotating the rotating pin 234 in such a manner as to be freely projected and received so as not to prevent the disc 1 from passing. The rotational motion of the passage actuator 232 is introduced to a rotational motion of the detecting lever 233 which is integrally formed and communicated with the lower cover 101, and introduced to the insertion detecting switch 235, whereby the detecting lever 233 presses the insertion detecting switch 235, thereby detecting the insertion of the disc 1.

Figure 4:
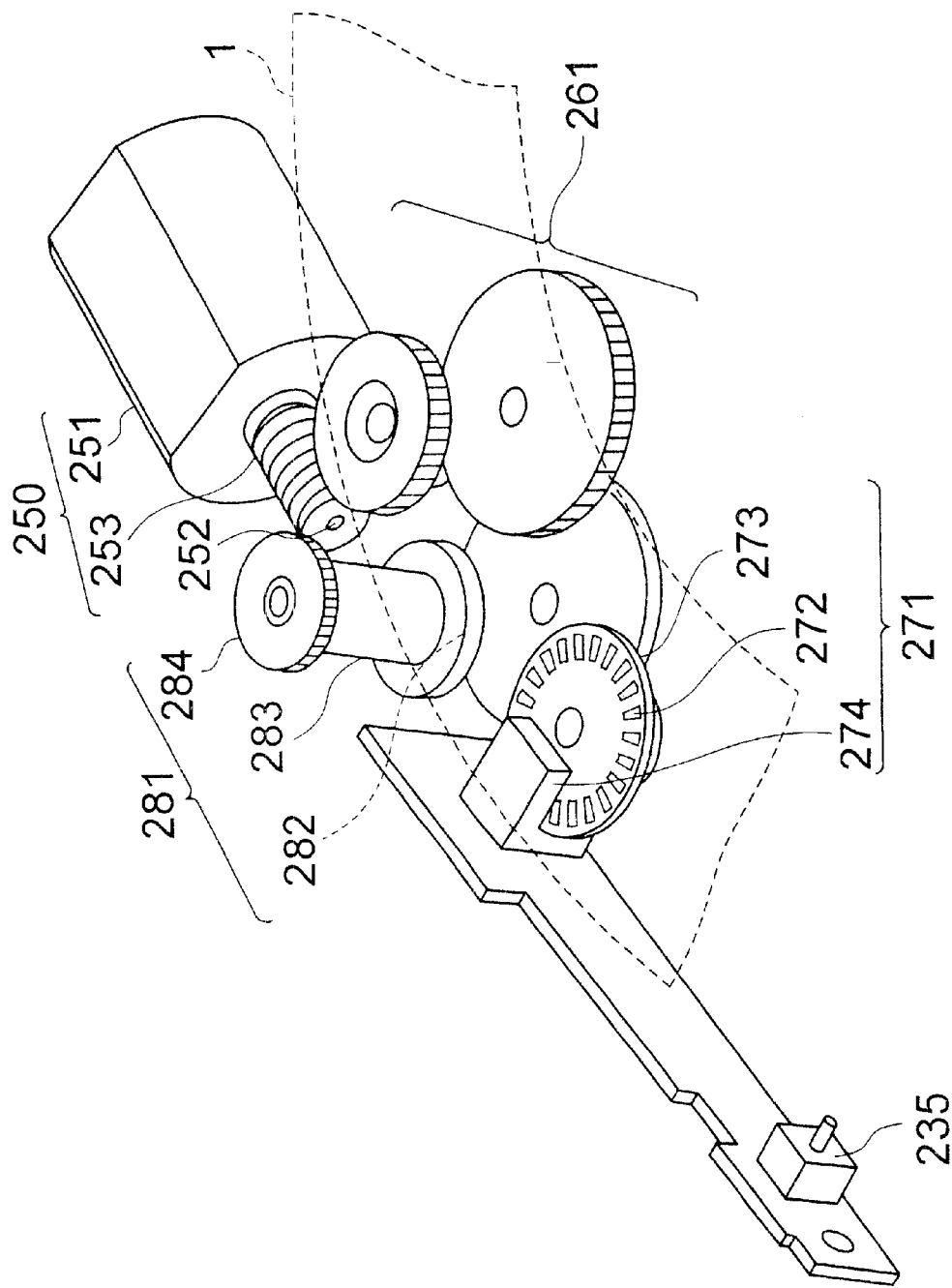
FIG. 4 is an enlarged perspective view of driving means in FIG. 1.

Next, a structure of the drive means 250 will be described. FIG. 4 is an enlarged perspective view of the drive means 250 in FIG. 1. In FIG. 1, the drive means 250 is constituted by a motor 251 corresponding to a drive source, a gear train 261 for reducing a speed, a drive gear 281 which drives transfer means 300 mentioned below, and an encoder 271 which detects an amount of rotation of the drive gear 281.

The motor 251 is arranged in a rear corner of the lower cover 101. It is because the motor is arranged out of a projecting area of the disc 1 so that a thickness of the motor 251 does not prevent the disc from being transferred and mounted. A drive worm 253 is pressure fitted to a shaft 252 of the motor 251 and the drive worm 253 is engaged with the gear train 261. A drive force of the motor 251 is reduced to a torque necessary for the gear train 261 and a sufficient speed of rotation, and is introduced to the encoder 271 and the drive gear 281.

The encoder 271 has a well-known structure, and the structure is made such that a disc 273 having slits 272 is fixed to a drive shaft and a photo sensor counts the slits 272, thereby detecting an amount of rotation of the drive gear 281. On the other hand, a force of rotation of the motor 251 is transmitted to the drive gear 281. The drive gear 281 is formed in a spool shape obtained by connecting a driven gear 282 to an output gear 284 by means of a connecting portion 283. By forming the shape in this manner, it is possible to arrange the driven gear 282 on a bottom surface of the lower cover 101 and arrange the output gear 284 on a top surface of the upper cover 131 with passing through a space corresponding to the passage for the disc 1 by the connecting portion 283. Accordingly, the space is utilized with no waste so as to secure the passage for the disc 1 and it is possible to transmit the force of rotation of the drive shaft to the transfer means 300 mentioned below.

Figure 5:
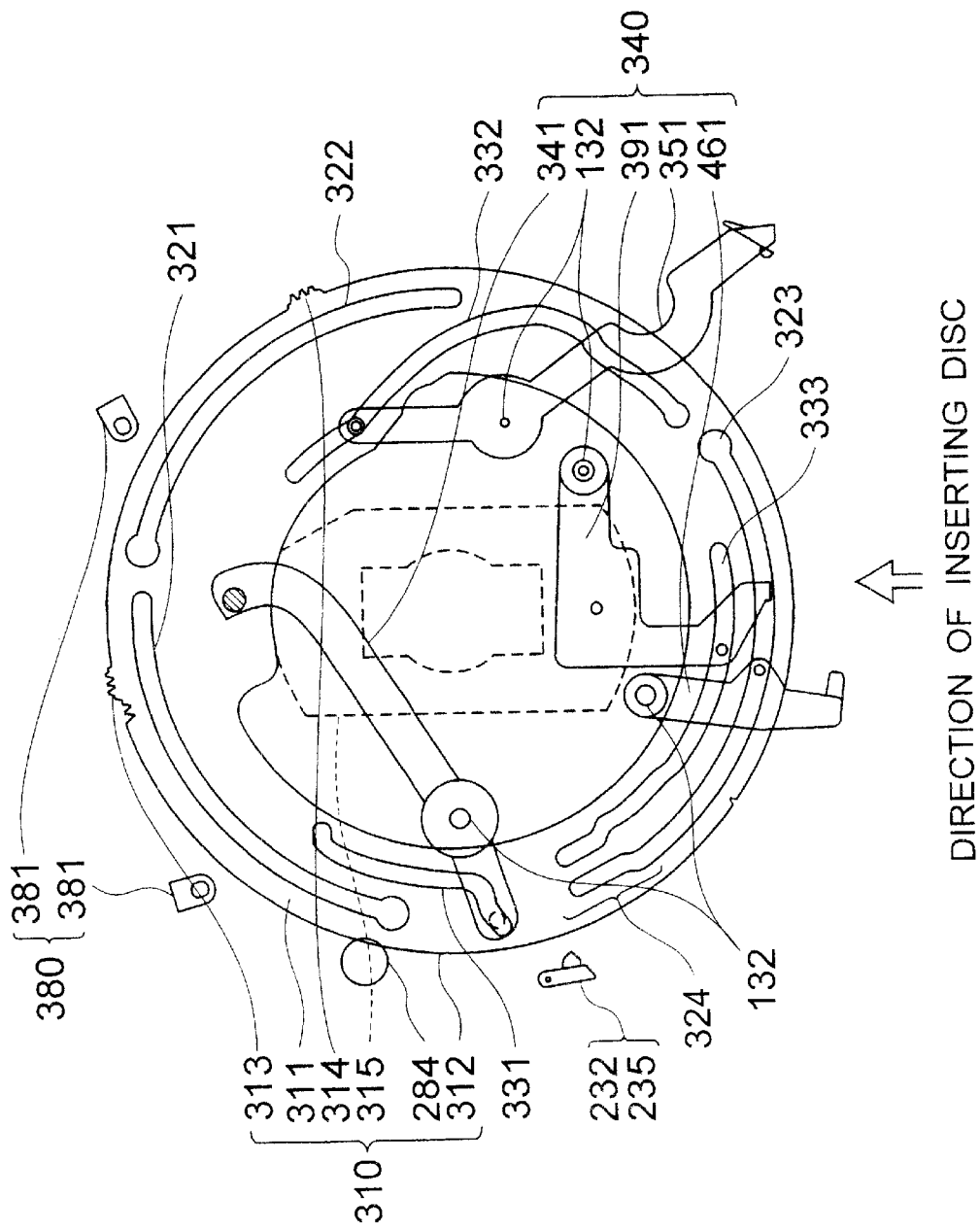
FIG. 5 is a view of transfer means as seen from a direction of the arrow A in FIG. 1.

Next, a structure of the transfer means 300 will be described. FIG. 5 is a view of the transfer means 300 as seen from a direction of an arrow A in FIG. 1, and shows a state in which the upper cover 131 is omitted. The transfer means 300 is constituted by synchronous drive means 310 corresponding to a drive source, medium drive means 340 which directly transfers and drives an optical disc, positioning means 380 which accurately guides the transferred optical disc to a position for mounting to the pick-up module 500, and pressing means 390 for stabilizing an attitude of the optical disc when mounting the optical disc.

At first, the synchronous drive means 310 is constituted by a ring gear 311 which is formed in a donut-like thin disc shape. An outer diameter of the ring gear 311 is set to be substantially equal to or smaller than that of the disc 1. In an outer peripheral portion thereof, a driven ring gear 312 which is meshed with the output gear 284 mentioned above is formed at an area of about one third of the periphery. The driven ring gear 312 is formed so that an addendum of tooth forms a substantially outer periphery of the ring gear 311. Further, in a subsequent area of about one thirds, two positioning gears A313 and B314 are formed so as to serve as an intermittent motion gear. The respective positioning gears A313 and B314 are meshed with two positioning pins 381 mentioned below, and rotate the positioning pin 381 only for a period necessary for mounting the optical disc. Each of the positioning gears A313 and B314 is formed so that a deddendum of tooth forms a substantially outer periphery of the ring gear 311.

Two groups of holes are formed on a thin disc surface of the ring gear 311. A first group forms a point of support for guiding a rotation of the ring gear 311 itself and is constituted by rotating holes A321, B322 and C323. Each of the rotating holes A321, B322 and C323 is formed in an oval hole having a circular arc shape along a circumference of the ring gear 311 on every area about one third of the whole circle. A rotation guiding pin 172 mentioned below is engaged with each of the rotating holes. In the manner mentioned above, the ring gear 311 rotates at a desired angle around the rotation guiding pin 172 corresponding to the point of support. In particular, since three rotating holes, that is, three rotation guiding pins 172 are provided, it is possible to define a center of the ring gear 311. Accordingly, although the ring gear 311 is formed in a donut-like thin disc shape, it is possible to accurately define the center of the rotating motion of the ring gear 311 and effectively utilize a central space portion 315 of the ring gear 311.

Another second group is structured such as to guide a point of force of the medium drive means 340 mentioned below, and is constituted by guiding holes A331, B332 and C333. The respective guiding holes A331, B332 and C333 are arranged in inner peripheral sides of the rotating holes A321, B322 and C323 and in such a manner as to form desired curves on intervals of the respective rotating holes. In this structure, when the ring gear 311 rotates, a function of a cam is generated at the point of force of the medium drive means 340 in accordance with a change of distance between an imaginary center of the ring gear 311 and the curves on the respective guiding holes, thereby generating a desired motion of the medium drive means 340 mentioned below. In this case, a rotating cam portion 324 is formed in an end portion of the rotating hole C323 mentioned above, and a part of the rotating hole C323 commonly serves as the guiding hole.

In particular, since the respective guiding holes mentioned above and the positioning gears A313 and B314 are arranged in a sheet of ring gear 311 and the ring gear 311 is rotated so as to operate the medium drive means 340 and the positioning means 380, it is possible to completely synchronize four kinds of swinging arms and the positioning pins 381 as mentioned below, so that it is possible to secure an accuracy of the motion of the whole of the apparatus. Further, since the outer diameter of the ring gear 311 is set to be the same or slightly smaller than that of the disc 1, together with the drive gear 281 mentioned above, it is possible to reduce the space and the projecting area necessary for the drive means 250 to a level which can be substantially ignored. Further, as a significant characteristic, since the ring gear 311 is formed by a thin steel plate having a thickness of 0.4 mm and structured such as to slide and rotate with respect to the upper cover 131, it is possible to set the thickness of the synchronous drive means 310 to be as thin as can be ignored in comparison with the thickness of the whole of the disc drive apparatus.

Figure 6:
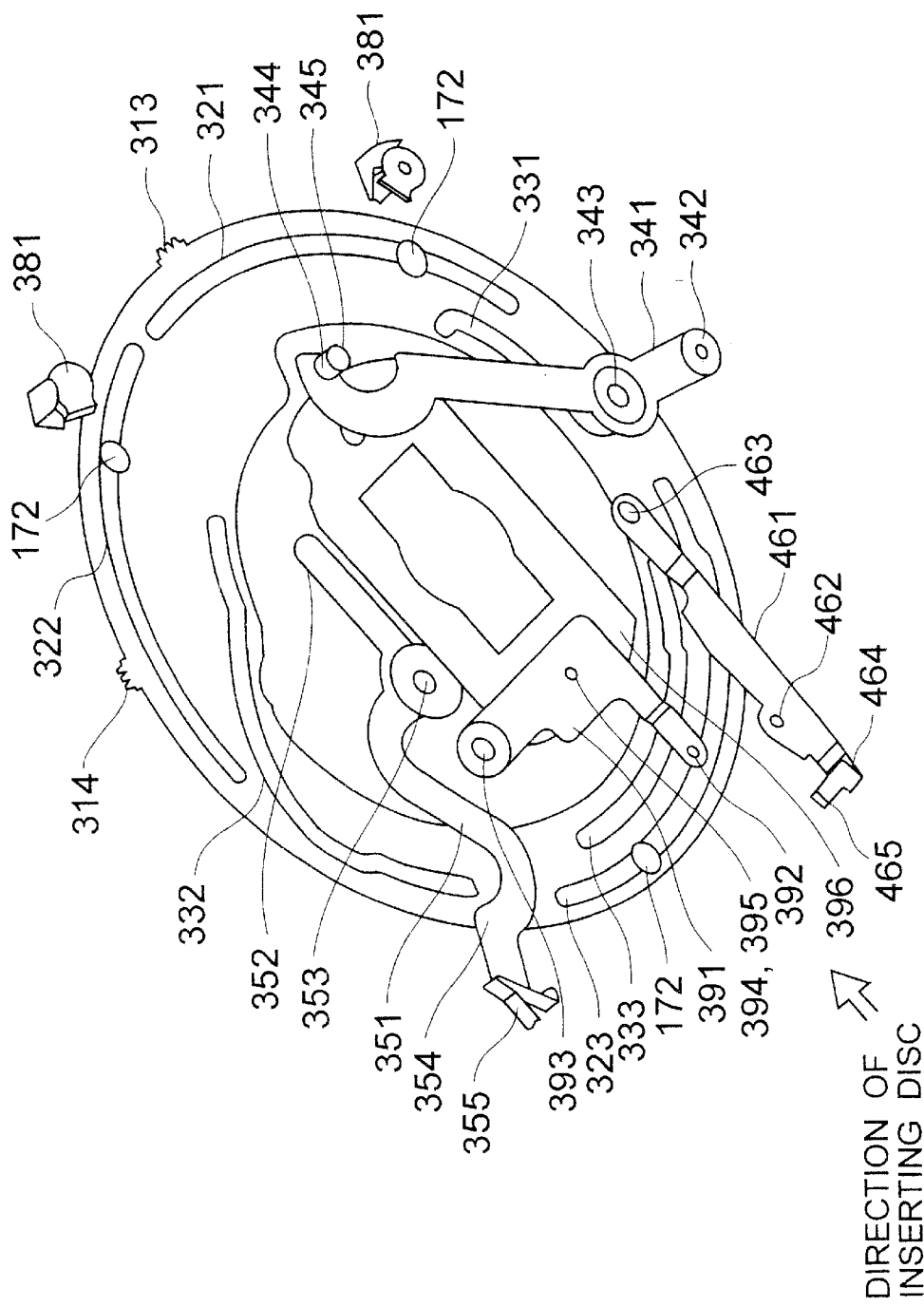
FIG. 6 is an exploded perspective view of medium driving means as seen from a direction of an arrow B in FIG. 1.

Next, a description will be given of each of the medium drive means 340 which swing in accordance with the respective guiding holes. FIG. 6 is an exploded perspective view of the medium drive means 340 as seen from a direction of an arrow B in FIG. 1, and shows a state obtained by reversing FIG. 5. The medium drive means 340 is constituted by four kinds of swinging arms. As is common to all the swinging arms, the structure is made such that a point of support is fixed to the upper cover 131, a point of force is slidably engaged with each of the guiding holes of the ring gear 311 as mentioned above, and a point of operation drives the disc and each of the means. Further, each of the swinging arms is formed by a thin steel plate having a thickness of 0.3 mm and is structured in a thin type.

At first, a description will be given of a discharge arm 341 as a first swinging arm. A pin is caulked and stood at a point 342 of force of the discharge arm so as to be engaged with the guiding hole A331 mentioned above. A point 343 of support of the discharge arm is axially attached to the upper cover 131 so as to freely swing by the support point pin 132 via a spacer or a drawing process for escaping the thickness of the ring gear 311. A point 344 of operation of the discharge arm is formed in a shape which can detect the mount detecting means 421 mentioned below at a final position (a position at which the disc is completely mounted) at which the discharge arm 341 swings. Further, a discharge pin 345 having a desired projecting stroke is axially attached to the point 344 of operation of the discharge arm so as to freely project and retract. The discharge pin 345 presses the outer peripheral edge of the disc 1 so as to discharge and drive the disc when the discharge arm 341 is returned from the swinging final position to the position of the original point.

Next, a description will be given of a take-in arm 351 as a second swinging arm. A pin is caulked and stood at a point 352 of force of the take-in arm so as to be engaged with the guiding hole B332 mentioned above. A point 353 of support of the take-in arm is axially attached to the upper cover 131 so as to freely swing by the support point pin 132 via a spacer or a drawing process for escaping the thickness of the ring gear 311. A take-in spring 355 is adhered to a point 354 of operation of the take-in arm. The take-in spring 355 is formed in a substantially V shape obtained by bending a plate spring to a desired shape, and is arranged so that a width of the plate spring passes through the space for inserting the disc 1. In a process that the take-in arm 351 swings from a waiting position to a final position, the take-in spring 355 presses the outer peripheral edge of the disc 1 and drives the disc 1 so as to take it in.

Further, a description will be given of a pressing arm 391 as a third swinging arm. A pin is caulked and stood at a point 392 of force of the pressing arm so as to be engaged with the guiding hole C333 mentioned above. A point 393 of support of the pressing arm is axially attached to the upper cover 131 so as to freely swing by the support point pin 132 via a spacer or a drawing process for escaping the thickness of the ring gear 311. A pressing spring 396 is commonly caulked with the pressing pin 395 and the pressing spring 396 is slidably mounted to a point 394 of operation of the pressing arm at a predetermined stroke. The pressing spring 396 is interlinked with the central space portion 315 mentioned above and is fixed to the upper cover 131 at a position opposite to the position where it is commonly caulked with the point 394 of operation of the pressing arm. The pressing arm 391 swings during a period after the ring gear 311 is rotated so as to start mounting the disc 1 and before the mounting is completed, and the pressing spring 396 is bent to the central space portion 315 at the stroke at which the point 394 of operation of the pressing arm swings so as to press the disc 1 in a direction of the pick-up module 500.

Finally, a description will be given of a shutter arm 461 as a fourth swinging arm. A pin is caulked and stood at a point 462 of force of the shutter arm so as to be engaged with the rotating hole C323 mentioned above. A point 463 of support of the shutter arm is axially attached to the upper cover 131 so as to freely swing by the support point pin 132 via a spacer or a drawing process for escaping the thickness of the ring gear 311. A shutter cam 465 is projected from a point 464 of operation of the shutter arm so as to be engaged with a shutter dog 458 mentioned below. The shutter arm 461 swings during a period after the ring gear 311 is rotated so as to start mounting the disc 1 and before the mounting is completed, and a shutter cam 465 drives a shutter 466 so as to close the insertion port of the disc 1.

Further, as a significant characteristic of the structure mentioned above, since each of the four kinds of swinging arms is formed by a thin steel plate, the point of support for a swing is provided in the upper cover 131, the swinging point of force is provided in the ring gear 311, each of the four kinds of swinging arms is overlapped only with the ring gear 311, the respective swinging arms are structured such as not to overlap with each other in all the process of the swinging operation, and the each of the swinging arms is structured such as not to enter into the passing space for the disc 1 in all the process of the swinging operation, it is possible to make the thickness of the medium driving means 340 as thin as can be ignored in comparison with the thickness of the whole of the disc drive apparatus and it is possible to securely transfer the disc.

Further, since one ring gear 311 is rotated so as to drive each of the four kinds of swinging arms, each of the four kinds of swinging arms is operated in a completely synchronous manner, and the operation is simultaneously performed in synchronous with the transfer position of the disc 1, so that it is possible to more securely transfer the disc.

Figure 7:
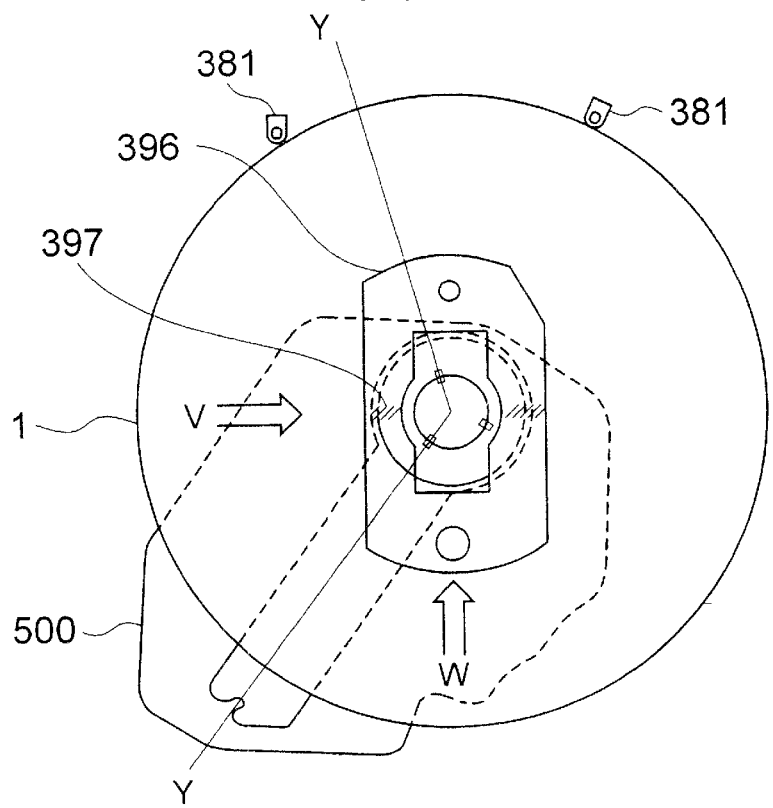
FIG. 7 is a view which shows a relation between a pressing spring in FIG. 6 and a disc.
Figure 7:
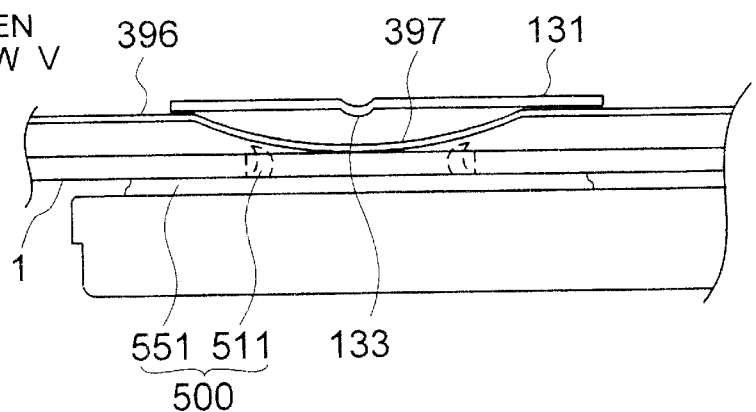
Figure 7:
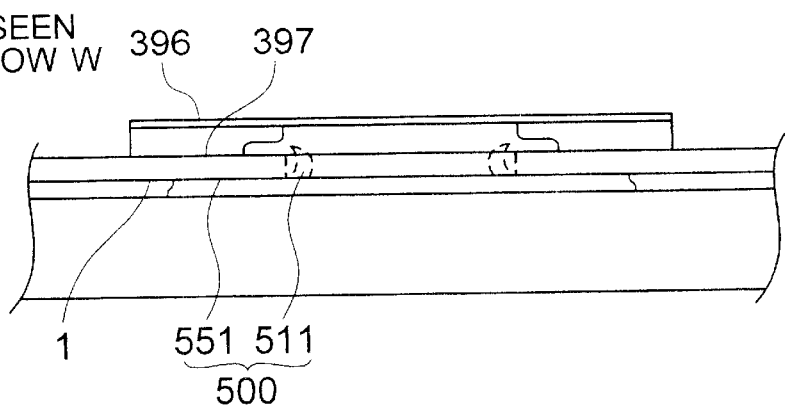

Next, with respect to the third swinging arm mentioned above, an operation of the pressing spring 396 will be described in more detail. FIG. 7 is a view which shows a relation between the pressing spring 396 in FIG. 6 and the disc 1, and shows a plan view and side elevational views in two directions in a state that the pressing spring 396 presses. The pressing spring 396 is formed in an oval shape in which a center portion is gauged out. An end of the oval is caulked to the point 394 of operation of the pressing arm, and another end in an opposite side is fixed to the upper cover 131. As mentioned above, the pressing spring 396 is pressed in a direction of an arrow W by the point 394 of operation of the pressing arm, and the pressing spring 396 is bent in a direction of the disc surface. Further, the pressing spring 396 is pulled by the point 394 of operation of the pressing arm so as to expand in a flat shape for a period for which the pressing arm 391 is returned to the waiting position (refer to FIG. 13 and the description mentioned below). (That is, as mentioned above, the pressing spring 396 is bent at a stroke at which the point 394 of operation of the pressing arm swings.) Accordingly, since the pressing spring 396 itself is formed to be thin during a period for which it is not pressed, it is possible to make the whole of the apparatus thin without preventing the passing space for the disc 1 from being formed.

As is later described in detail, when the pressing spring 396 presses the disc 1, the disc 1 is brought into contact with two positioning pins 381 and pressed by take-in spring 355. Then, in this state, the center of the disc 1 coincides with the center of the pick-up module 500, and the disc 1 is mounted to rotating and driving means 551 and is fixed by mounting and fixing means 511.

In order to obtain an excellent effect mentioned above, a thin sheet material excellent in a flexibility is desirable for the pressing spring 396. For example, a resin sheet, a thin steel plate and the like are suitable. In the present embodiment, it is possible to obtain a preferable effect by employing, for example, a resin sheet having a thickness of 0.2 mm.

As a result of this bending, a portion by which the pressing spring 396 presses the disc 1 corresponds to a pressing portion 397, which is shown by a hatched line in a plan view of FIG. 7. A preferable position for setting the pressing portion 397 is set to an optimum position at which the mounting and fixing means 511 mounts and releases the disc 1, and is set to a range between 15 mm and 40 mm of a diameter of an inner peripheral portion of the disc 1. Further, as shown in the pressing portion 397, by pressing two portions in both sides with respect to the center of the disc 1, it is possible to uniformly press and urge between right and left portions, so that it is possible to stabilize an attitude of the disc 1 and securely mount and release the disc 1. A condition for setting the pressing portion 397 is determined by a pressing force necessary for stabilizing the attitude of the disc 1, a spring force on the basis of the material of the pressing spring 396 and a torque when the pressing arm 391 swings. In the present embodiment, a preferable operation result can be obtained by setting the condition to the material condition for the pressing spring 396 mentioned above and setting the diameter of the inner peripheral portion of the disc 1 to the range between 15 mm and 30 mm.

In this case, as is apparent from a comparison between FIGS. 1 and 7, an expanding portion 133 which protrudes in a direction of the pressing spring 396 is formed at a position of the upper cover 131 corresponding to the pressing portion 397 at which the pressing spring 396 presses the disc 1. The expanding portion 133 exists at this position, whereby the pressing spring 396 is brought into contact with the expanding portion 133 of the upper cover 131 when the pressing spring 396 is pulled by the point 394 of operation of the pressing arm so as to be extended in a flat surface. Accordingly, when the point 394 of operation of the pressing arm presses the pressing spring 396, the pressing spring 396 is always bent in a direction of the disc surface. In the manner mentioned above, it is possible to apply a bending formation to the pressing spring 396, and further it is possible to reduce an initial swinging load at the beginning of the swinging operation of the pressing arm 391.

Figure 8:
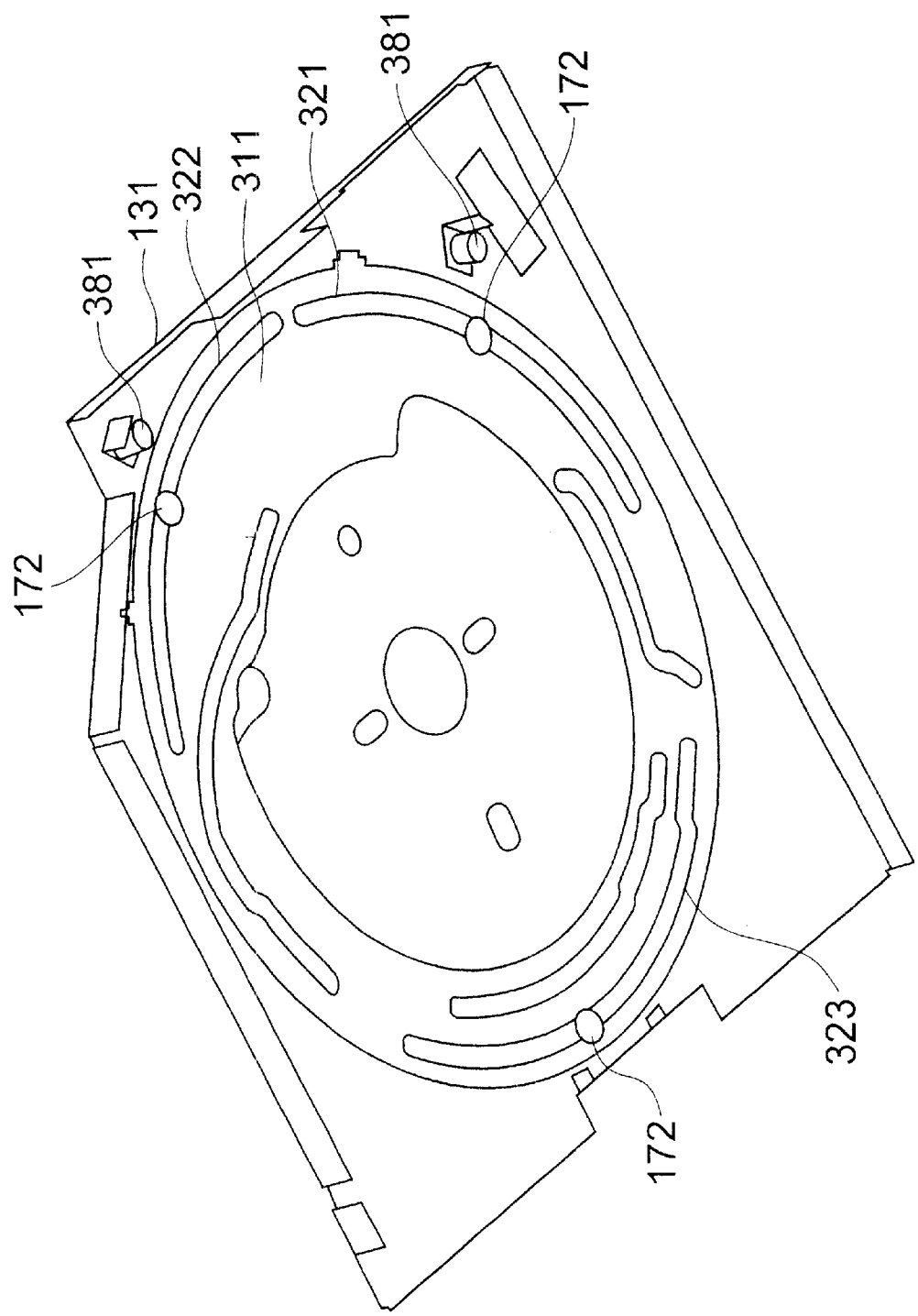
FIG. 8 is a view of an upper cover and a ring gear as seen from the direction of the arrow B in FIG. 1.

Next, FIG. 8 is a view of the upper cover and the ring gear as seen from the direction of the arrow B in FIG. 1. With reference to FIG. 8, a description will be given of the pivot mechanism which is provided in the upper cover 131 described at the beginning. As mentioned above, the pivot mechanism 171 is constituted by three rotation guiding pins 172. Each of the rotation guiding pins 172 is caulked and stood from the upper cover 131 at a position which defines the center of the ring gear 311. Accordingly, it accurately guides the center of the rotating motion of the ring gear 311.

In this case, as explained in FIG. 5 mentioned above that the outer diameter of the ring gear 311 is substantially equal to or slightly smaller than that of the disc 1, the outer diameter of the ring gear 311 in the embodiment in accordance with the present invention is, for example, set to be 114 mm (in this case, the positioning gear A and B portions are excluded) while the standard of the outer diameter of the disc 1 is 120 mm. Further, the upper cover 131 (refer to FIG. 12) which mounts the ring gear 311 is formed in such a manner that a width w is 128 mm and a depth d is 132 mm. Accordingly, an outer width W of the whole of the apparatus after mounting the inserting port means 450 is set to be equal to or less than 131 mm and a depth D thereof is set to be equal to or less than 135 mm. Accordingly, it is possible to set the outer shape of the disc drive apparatus to a compact shape substantially equivalent to a regular square which is circumscribed with the outer shape of the disc, and it is possible to provide a compact disc drive apparatus which can be mounted to a note-book type computer.

In the same manner, a description will be given of a state that the other points of support and the other pins are stood. As mentioned above, four points 132 of support are caulked and stood on the upper cover 131 (refer to FIG. 5). This is because four kinds of swinging arms are rotatably fixed.

As mentioned above, since the structure is made such that the rotation guiding pins 172 which define the center of the ring gear 311 are stood on the upper cover 131, the ring gear 311 is axially attached so as to be freely rotated, four pins 132 for the points of support are caulked and stood on the upper cover 131 so as to form the points of support of the respective swing motions of the respective swinging arms, and the swinging point of force is provided in the ring gear 311, it is possible to construct the whole of the disc drive apparatus to be thin. Further, since the casing can be commonly used as a supporting mechanism by supporting the transfer means 300 to the upper cover 131, the structure becomes simple and it is possible to obtain a structure which is suitable for a more thin and compact construction.

Figure 9:
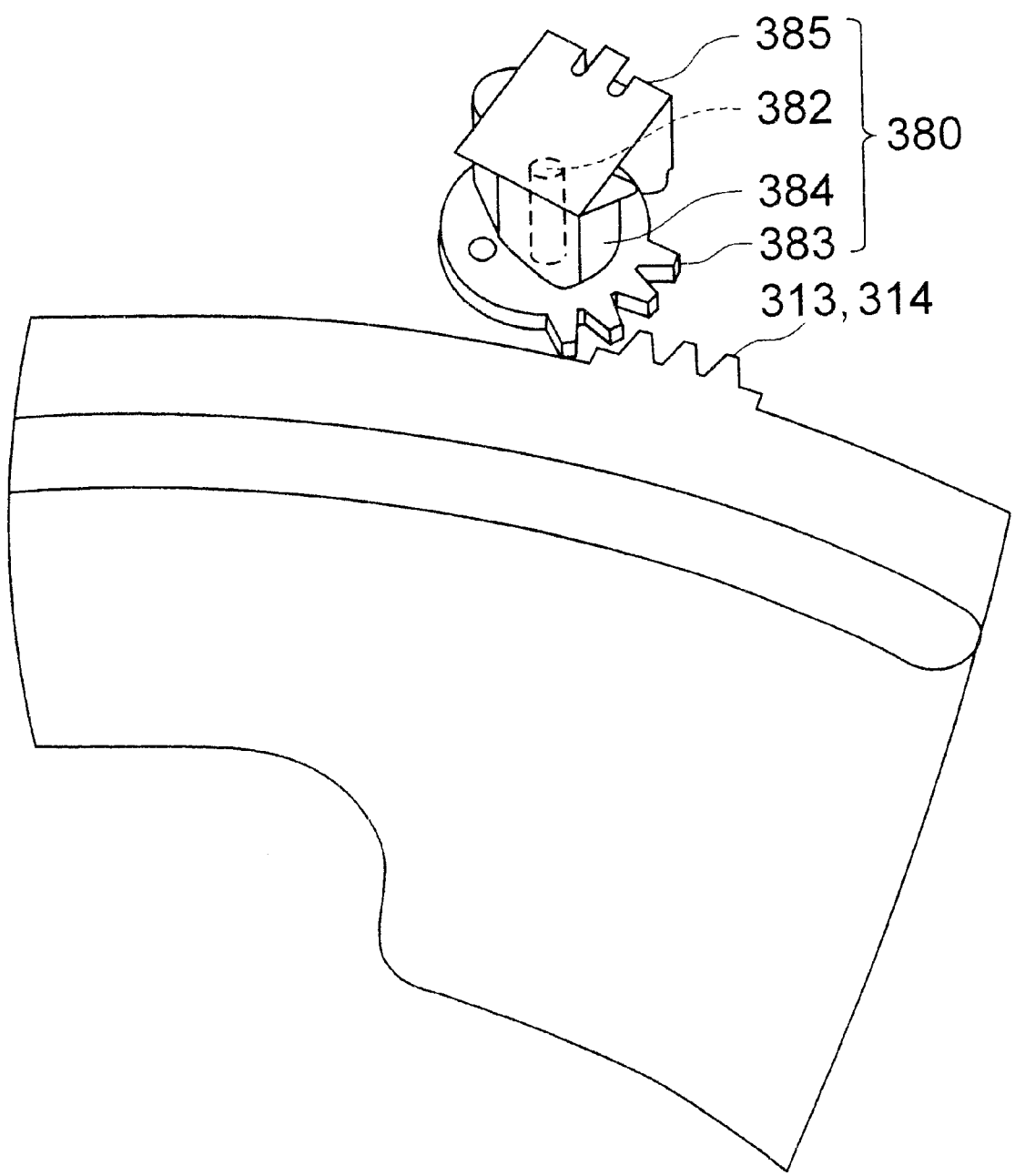
FIG. 9 is an enlarged view of a positioning pin in FIG. 8.

In addition, two positioning shafts 382 are caulked and stood on the upper cover 131 (refer to FIGS. 8 and 9). The positioning shafts 382 are stood at positions at which the center of the disc 1 coincides with the center of the pick-up module 500 in a state that the disc 1 is brought into contact with two positioning pins 381 as mentioned above. That is, the standing positions correspond to the positions of the positioning pins 381 corresponding to the contact body.

The positioning pin 381 mentioned above is axially attached to the positioning shaft 382. The positioning pin 3.81 is formed in an intermittent motion gear portion 383 which is meshed with the positioning gears A313 and B314 of the ring gear 311 and a positioning portion 384 which is brought into contact with the peripheral edge of the disc 1. The positioning portion 384 is formed in a cylindrical shape which is axially attached to the positioning shaft 382 and has a shape obtained by combining substantially a half of a thick cylinder portion and a half of a thin cylinder portion.

Further, a positioning spring 385 is provided in the positioning pin 381 and is arranged in such a manner as to keep two positions when the positioning pins 381 is rotated. FIG. 9 is a view which shows the positioning pin in FIG. 8 in an enlarging manner. One of two positions is a position at which the intermittent motion gear portion 383 opposes to the ring gear 311 and the thick cylindrical portion of the positioning portion 384 opposes to a direction of forward motion of the disc 1, that is, a waiting position. Another of two positions is a position at which the intermittent motion gear portion 383 is engaged with the positioning gear 313 and B314 of the ring gear 311 so as to be rotated, and the thin cylinder portion of the positioning portion 384 opposes to the direction of forward motion of the disc 1, that is, an attaching position.

Accordingly, when the disc 1 moves forward at the waiting position, the outer peripheral portion of the disc 1 is brought into contact with the thick cylindrical portion of the positioning portion 384. After finishing the positioning, the positioning pin 381 is rotated to the mounting position for attaching the disc 1 to the rotating and driving means 551, and the disc 1 is released from the positioning.

Next, a description will be given of medium monitoring means 400 for detecting the position of the disc 1 and monitoring the motion thereof. The medium monitoring means 400 is arranged at important positions for monitoring the motion of the disc 1 in addition to the motion (positioning) of the disc 1 mentioned above, thereby controlling the motion. The important positions include three points comprising a position for inserting the disc, a position for completing the mount and a position for completing the discharge. Among them, the position for inserting the disc is already described with respect to the insertion detecting sensor 231.

Figure 10:
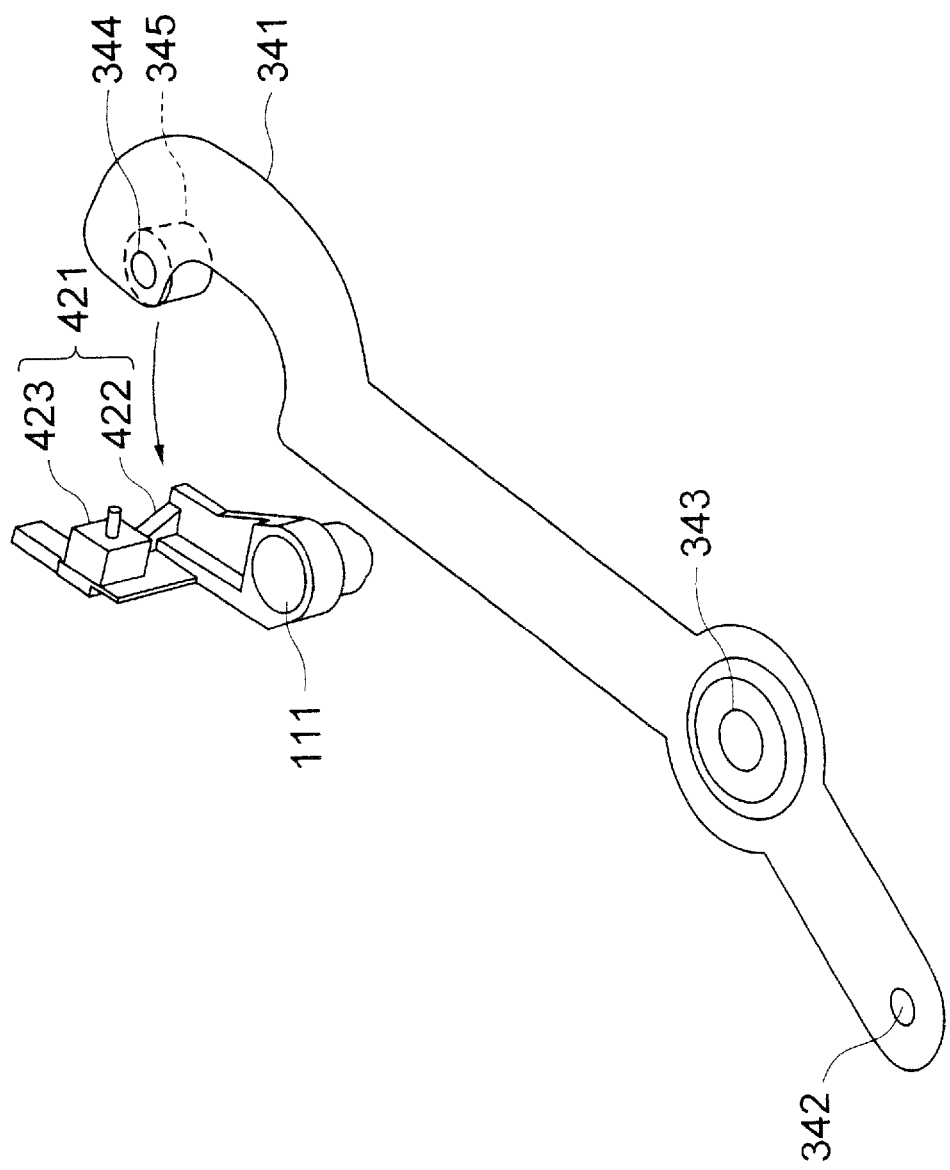
FIG. 10 is a partly enlarged perspective view of mount detecting means in FIG. 2.

Next, a description will be given of mount detecting means 421. FIG. 10 is a partly enlarged perspective view of the mount detecting means in FIG. 2. As mentioned above, the mount detecting means 421 mentioned below detects the final position at which the discharge arm 341 swings (that is, the position of completing the mount of the disc). The mount detecting means 421 is constituted by a base 422 and a detecting switch 423, and is structured such that the base 422 is fixed to a pin post 111 stood at a predetermined position of the lower cover 101 and the detecting switch 423 is fixed to the base 422.

Figure 11:
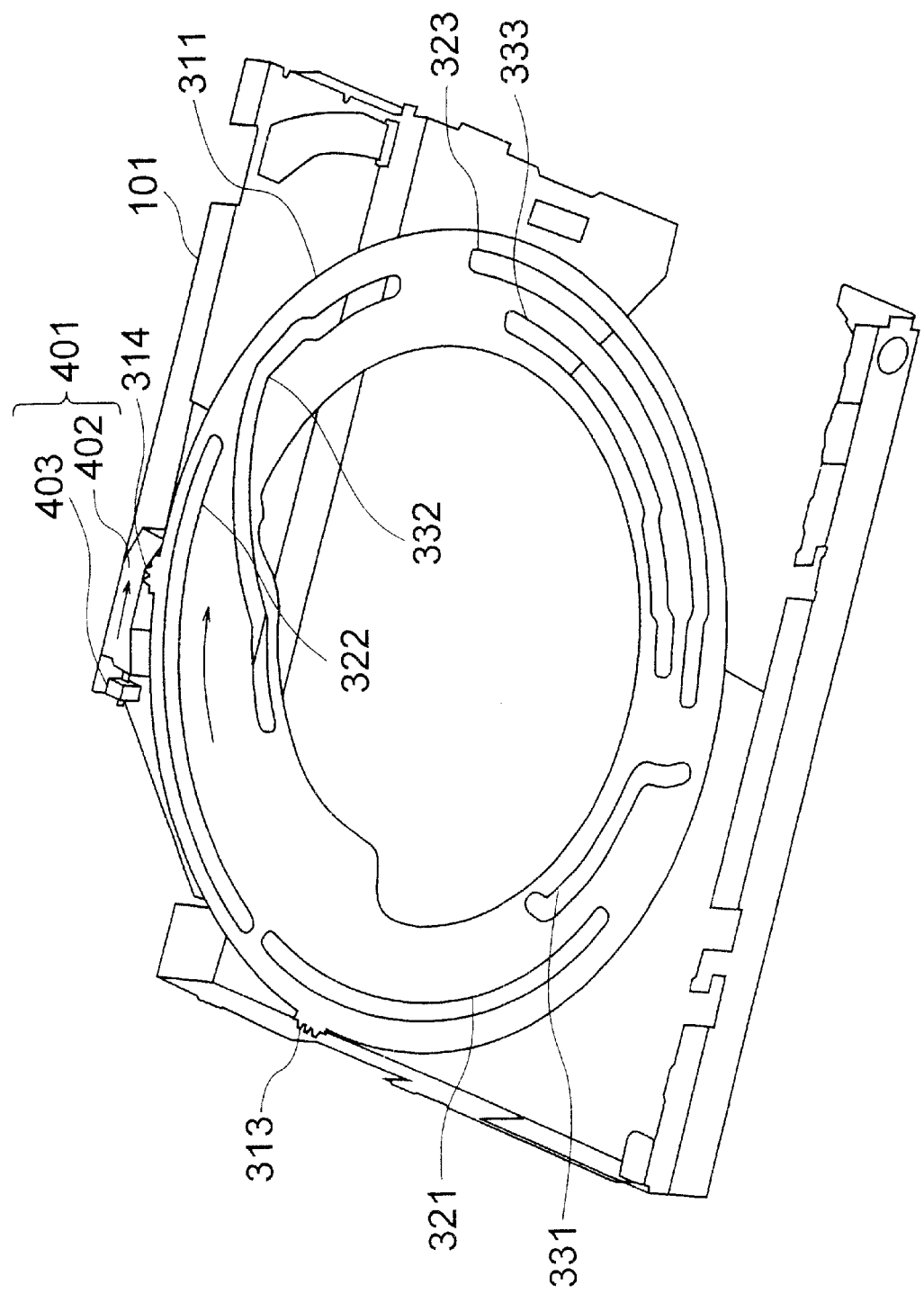
FIG. 11 is a partly enlarged perspective view of an original point switch as seen from the direction of the arrow A in FIG. 1.

A description will be subsequently given of discharge detecting means 401. FIG. 11 is a partly enlarged perspective view of the original point switch in FIG. 2 as seen from the direction of the arrow A in FIG. 1. With respect to the remaining position of completing the discharge, the discharge arm 341 presses the outer periphery of the disc 1 so as to complete the discharge motion when the discharge arm 341 swings and returns to the position of the original point, that is, it corresponds to a position of completing the discharge. At this time, since the discharge arm 341 exists in the passing space for the disc 1, it is impossible to detect by the switch as mentioned above.

On the other hand, since the ring gear 311 is rotated to the position of the original point (that is, the position of completing the discharge=the position of the original point of the ring gear 311), the discharge detecting means 401 is structured in such a manner as to detect the original point of the ring gear 311. A guide post 112 is caulked and stood on the lower cover 101, an original point actuator 402 is arranged so as to be urged in a direction that the ring gear 311 rotates, and an original point switch 403 is brought into contact therewith. When the ring gear 311 is rotated to the position of the original point, a tooth of the positioning gear B314 presses the original actuator 402, and the original point switch 403 is operated. Accordingly, the position of completing the discharge is detected by detecting the position of the original point of the ring gear 311.

Figure 12:
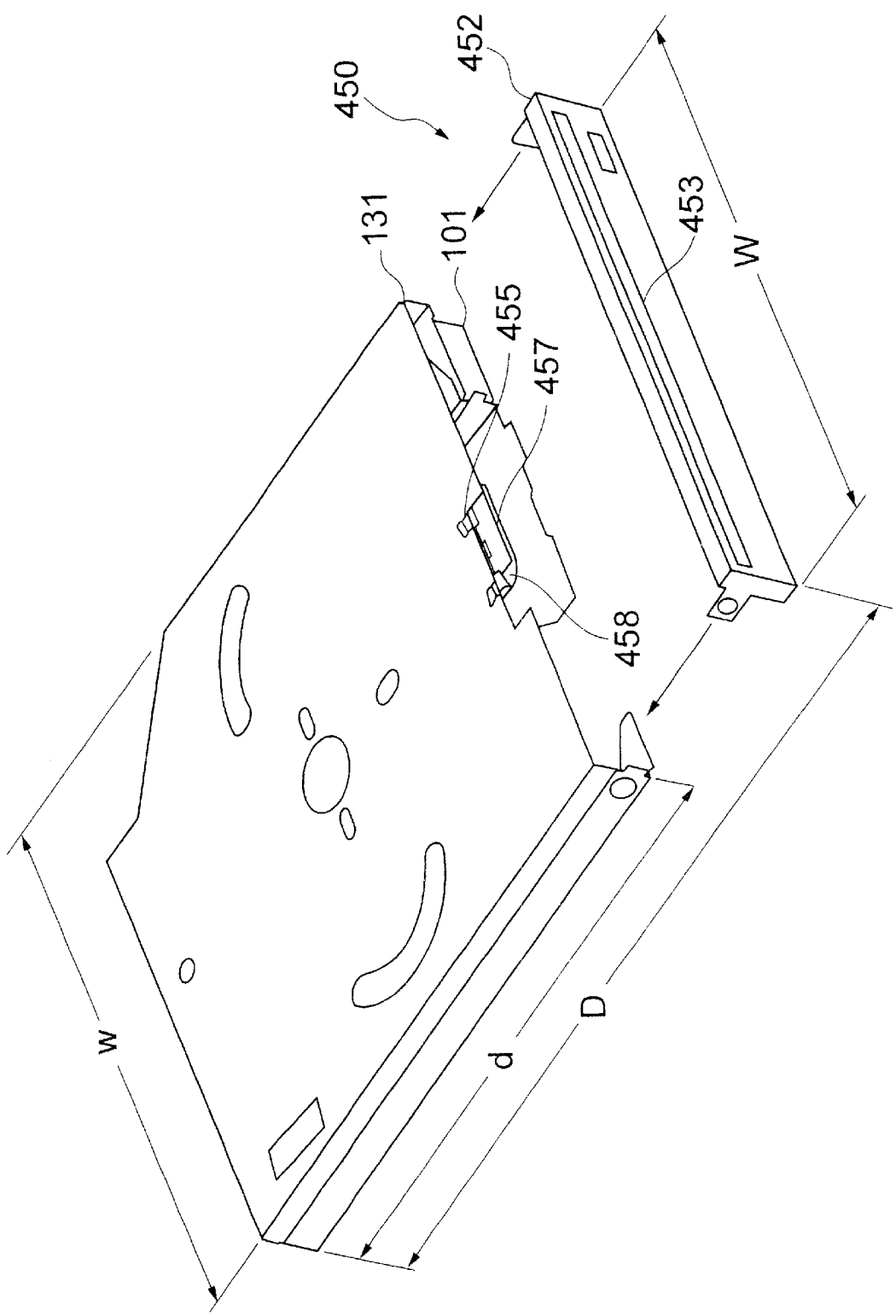
FIG. 12 is an exploded perspective view as seen from a direction of insertion in FIG. 1.
Figure 13:
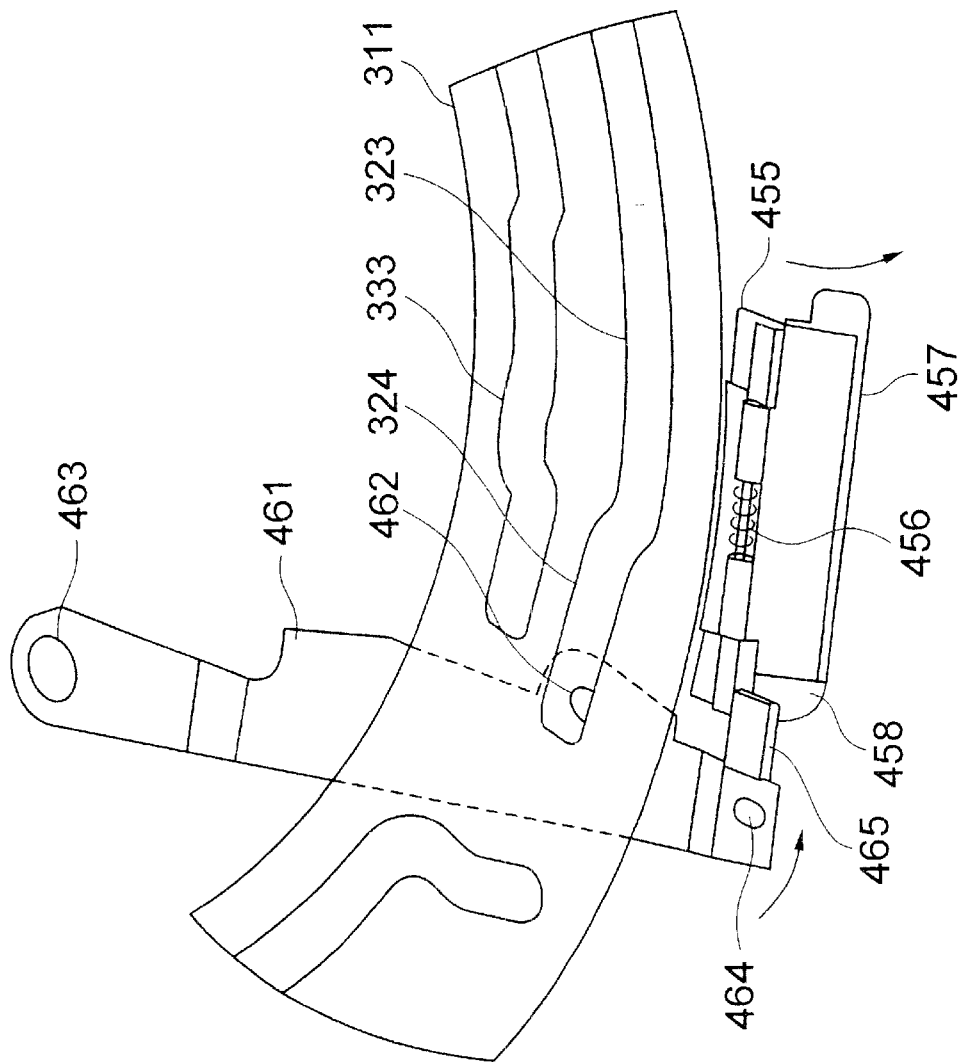
FIG. 13 is a partly enlarged perspective view of FIG. 12.

Next, a description will be given of the inserting port means 450. FIG. 12 is an exploded perspective view as seen from a direction of insertion in FIG. 1, and FIG. 13 is a partly enlarged perspective view of FIG. 12. In FIGS. 12 and 13, the inserting port means 450 is a contact point between the disc drive apparatus in accordance with the present invention and the operator, and a consideration is taken in view of a safety for the operation and a prevention of an erroneous operation. With respect to the safety for the operation, the description is given of the insertion detecting sensor 231 mentioned above. A description will be subsequently given of the prevention of the erroneous operation. Since the disc 1 can not be externally recognized after the disc 1 is inserted, it can be considered that there is a case of erroneously inserting second disc. In order to prevent this erroneous operation, when the disc 1 is inserted, the inserting port is closed, thereby protecting the apparatus.

After connecting the upper cover 131 to the lower cover, a vessel 452 is attached to an opening portion in the side of the operator. An inserting port 453 for inserting the disc 1 is opened in the vessel 452. A width of the opening of the inserting port 453 is set to be slightly wider than the outer diameter of the disc 1 and a thickness of the opening is set to be slightly thicker than a thickness of one disc 1. Then, the inserting port 453 is continuously arranged with the grooves L212 and R222 mentioned above. A shutter base 455 is mounted to the upper cover 131 which is positioned at the center portion of the inserting port 453. A shutter 457 is axially attached to the shutter base 455 via a shutter spring 456 so as to freely swing. Further, the shutter 457 is urged in a direction of opening the inserting port 453 by the shutter spring 456. In accordance with the swing motion of the shutter arm 461, a point 464 of operation of the shutter arm (that is, a shutter cam 465) is brought into contact with the shutter 457. A shutter dog 458 is formed at the contact portion of the shutter 457. Due to the contact of the shutter cam 465, the shutter dog 458 is rotated and the shutter 457 closes the inserting port 453.

Figure 14:
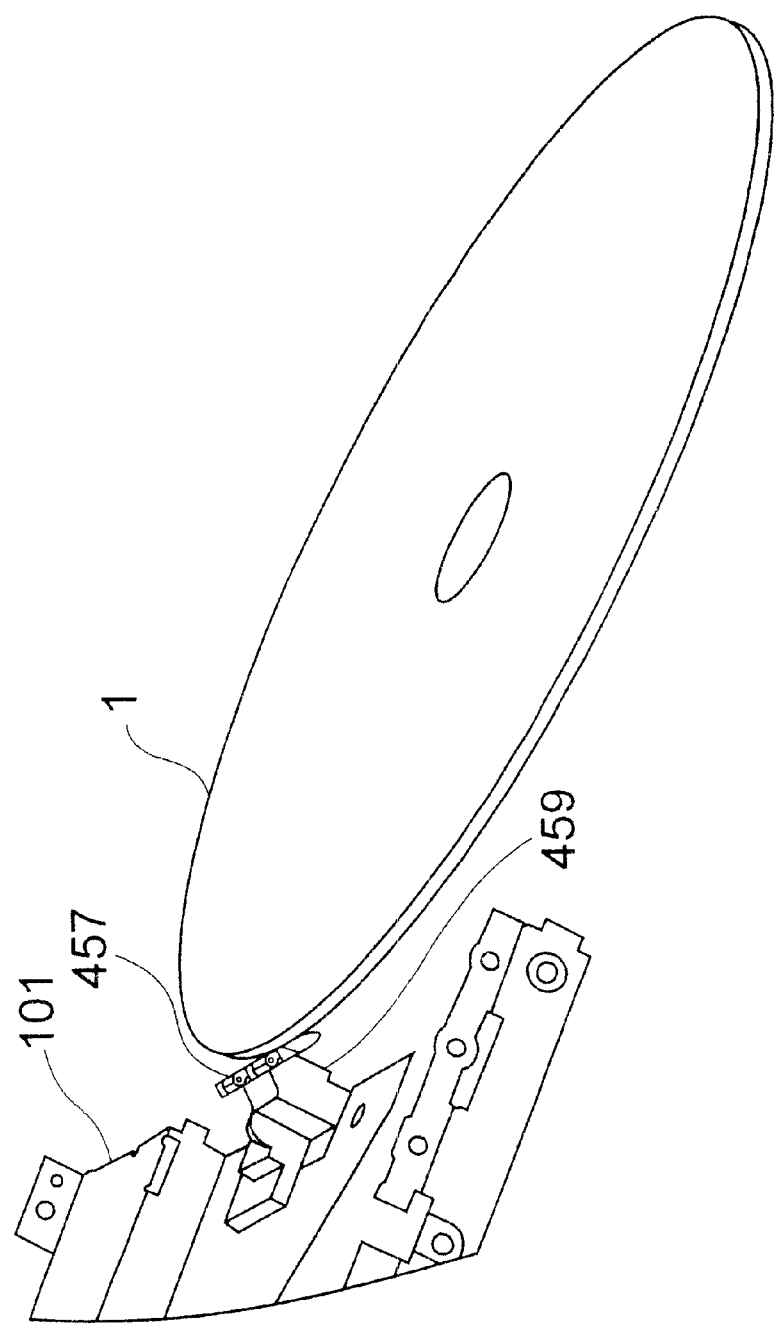
FIG. 14 is a partly enlarged perspective view of FIG. 12 when a shutter is closed.

FIG. 14 is a partly enlarged perspective view of FIG. 12 when a shutter is closed. A shutter support 459 is mounted to the lower cover 101. The shutter support 459 is positioned at the center portion of the vessel 452, and has an inclined surface portion which is inclined toward the inserting port 453. Then, when the shutter 457 closes the inserting port 453, (a back surface side of) the shutter 457 is brought into contact with the inclined surface portion of the shutter support 459. At this time, when the disc 1 is inserted, the shutter 457 is pressed by the disc 1, however, the pressing force is burdened with the shutter support 459 which is brought into contact with the shutter 457.

Figure 15:
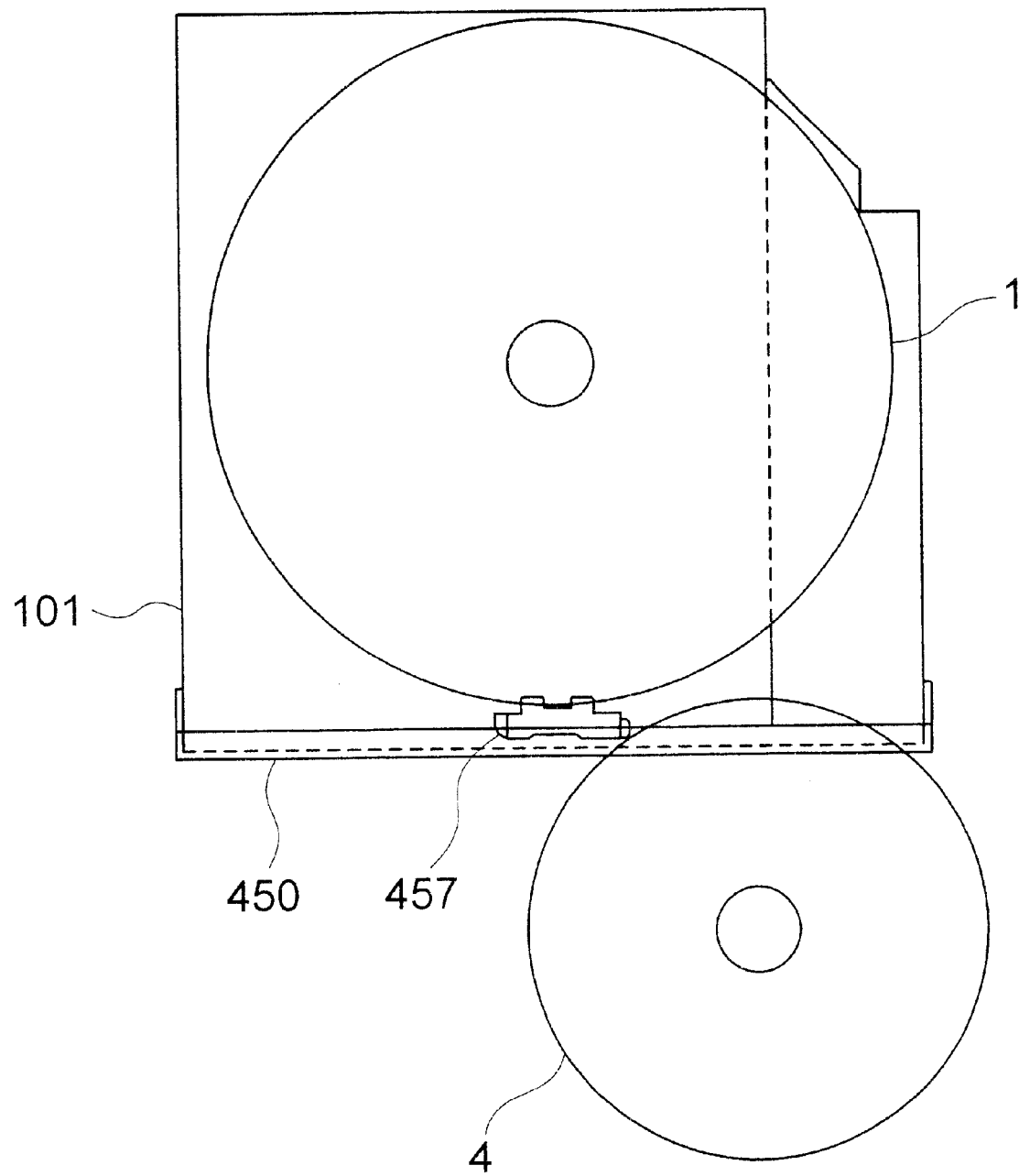
FIG. 15 is a view which shows a state that a disc having a small diameter is going to be inserted when the shutter in FIG. 12 is closed.

Further, FIG. 15 is a view which shows a state that a disc having a small diameter is going to be inserted when the shutter in FIG. 12 is closed. In accordance with the present invention, since the shutter 457 is mounted at the center portion of the upper cover 131, it is possible to prevent the disc 4 having a small diameter from entering into the drive apparatus when the shutter 457 is under a closed state, even in the case of the small-sized shutter shape as shown in FIG. 15.

Again in FIGS. 1 and 2, a circuit board 441 and a protecting cover 191 which constitute the control portion 440 are arranged at the rear portion of the disc drive apparatus. A memory which stores a program for controlling the whole of the disc drive apparatus including a signal processing circuit for reproducing an information from the signal read out from the disc 1, and the like are mounted on the circuit board 441. On the other hand, the protecting cover 191 protects the circuit board 441, and limits a range of the motion of the disc 1 for the case that a deformed disc or the like is inserted in place of the disc 1.

Figure 16:
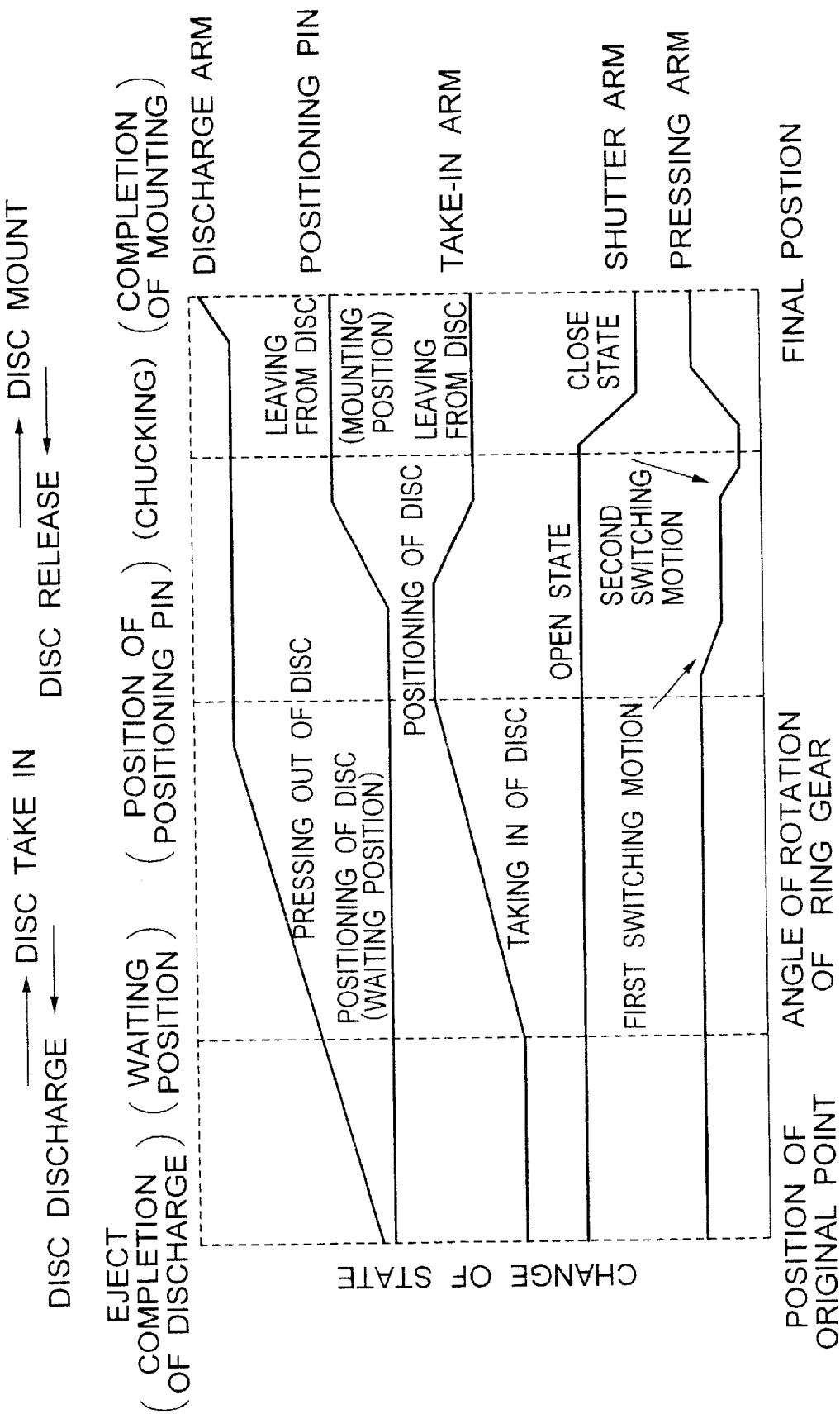
FIG. 16 is a sequence chart which shows a motion of the transfer means in FIG. 1.
Figure 17:
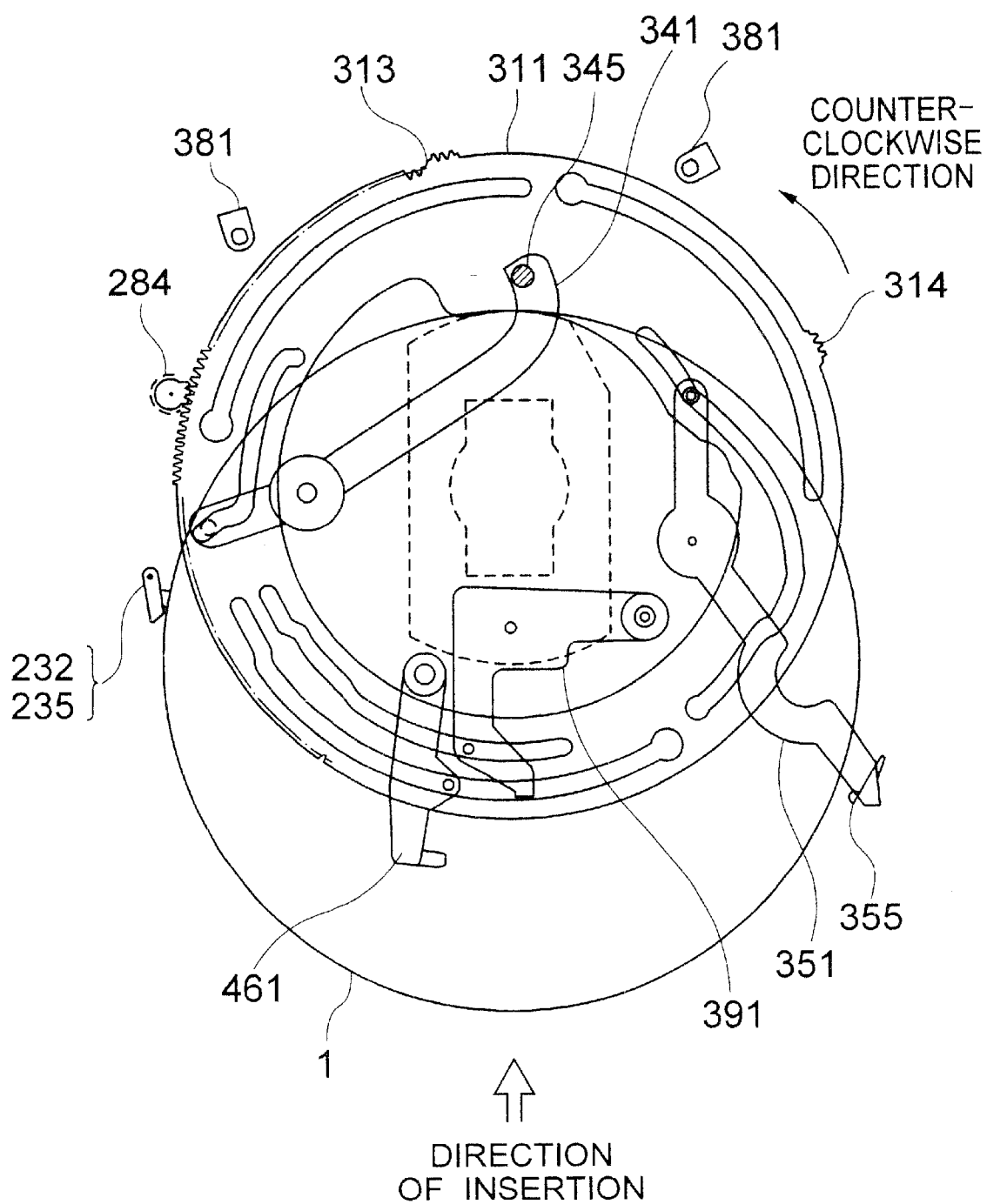
FIG. 17 is a view which shows an insertion state of the disc at a waiting position in FIG. 16.
Figure 18:
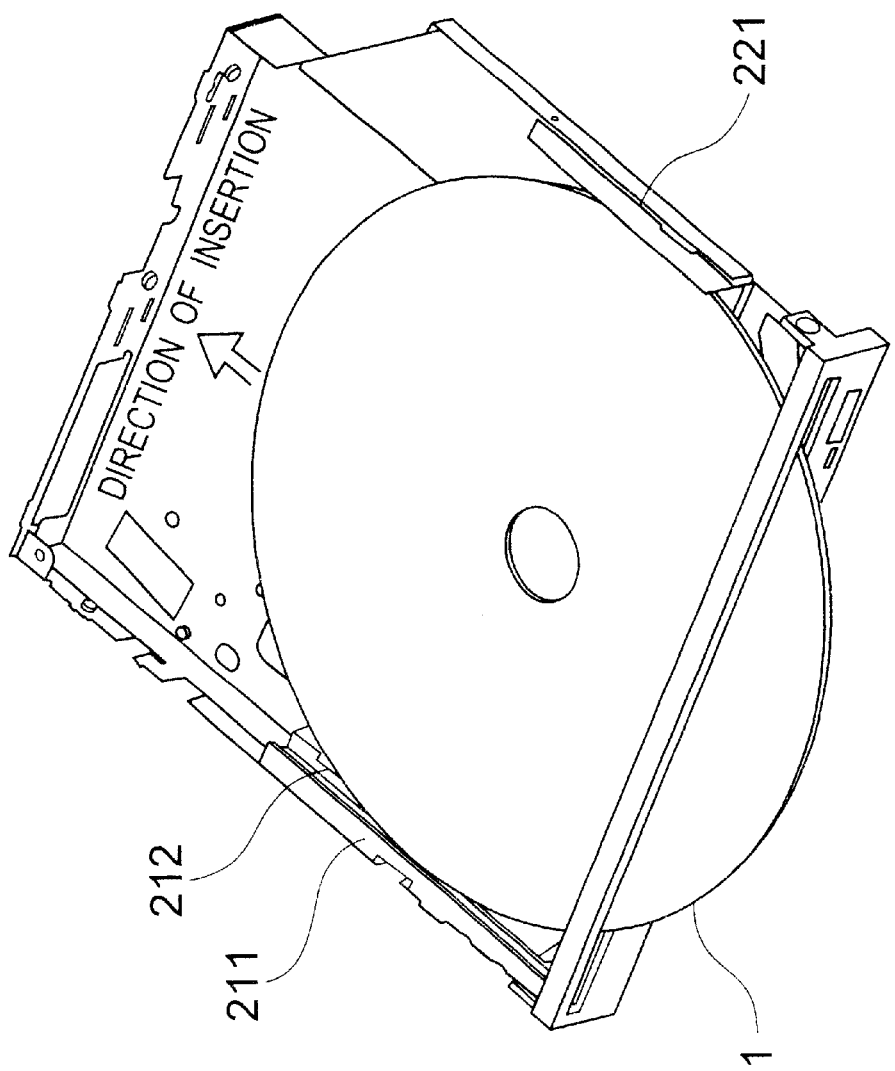
FIG. 18 is a perspective view which shows an insertion state of the disc at a waiting position in FIG. 16.
Figure 19:
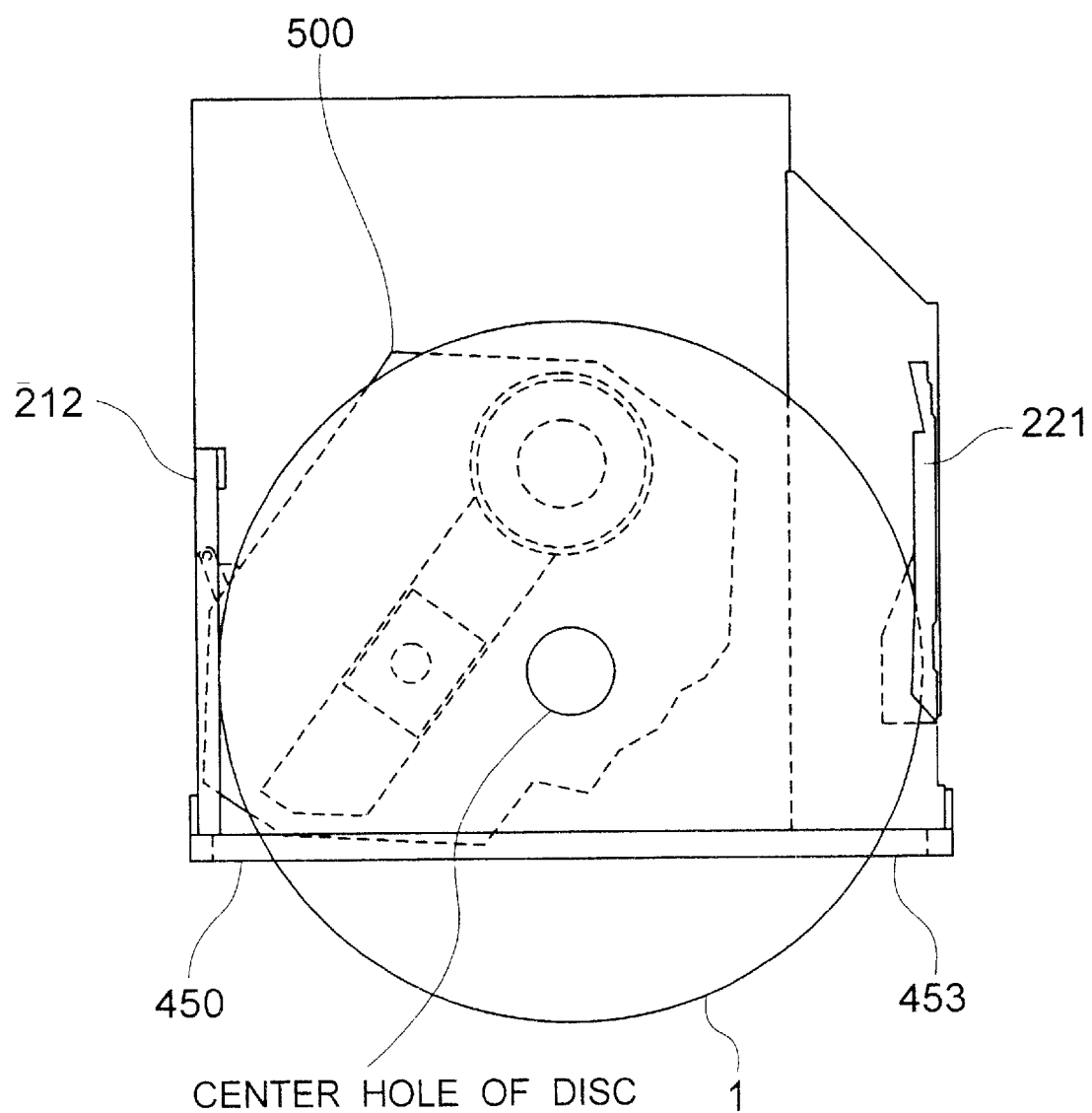
FIG. 19 is a plan view which shows an insertion state of the disc at a waiting position in FIG. 16.

With respect to the disc drive apparatus of the present invention which is structured in the manner mentioned above, a description will be given of a series of operations between the insertion of the disc and the discharge of the disc. FIG. 16 is a sequence chart which shows a motion of the transfer means in FIG. 1. In FIG. 16, a horizontal axis shows an angle of rotation of the ring gear 311, in which a left end shows a position of an original point (a position of the completion of the discharge) and a right end shows a final position (a position of the completion of the mounting). Further, five polygonal lines in the horizontal axis show changes of the operating states of four medium drive means 340 and the positioning pin 381. That is, FIG. 16 shows an interlinking relation of the transfer means in accordance with the rotation of the ring gear 311. Further, FIGS. 17, 18 and 19 are views which show an insertion state of the disc at the waiting position in FIG. 16, and show the state that the disc 1 is inserted to the position shown in FIG. 5. The inserting operation of the disc will be described with reference to FIGS. 1 and 16 to 19.

Figure 20:
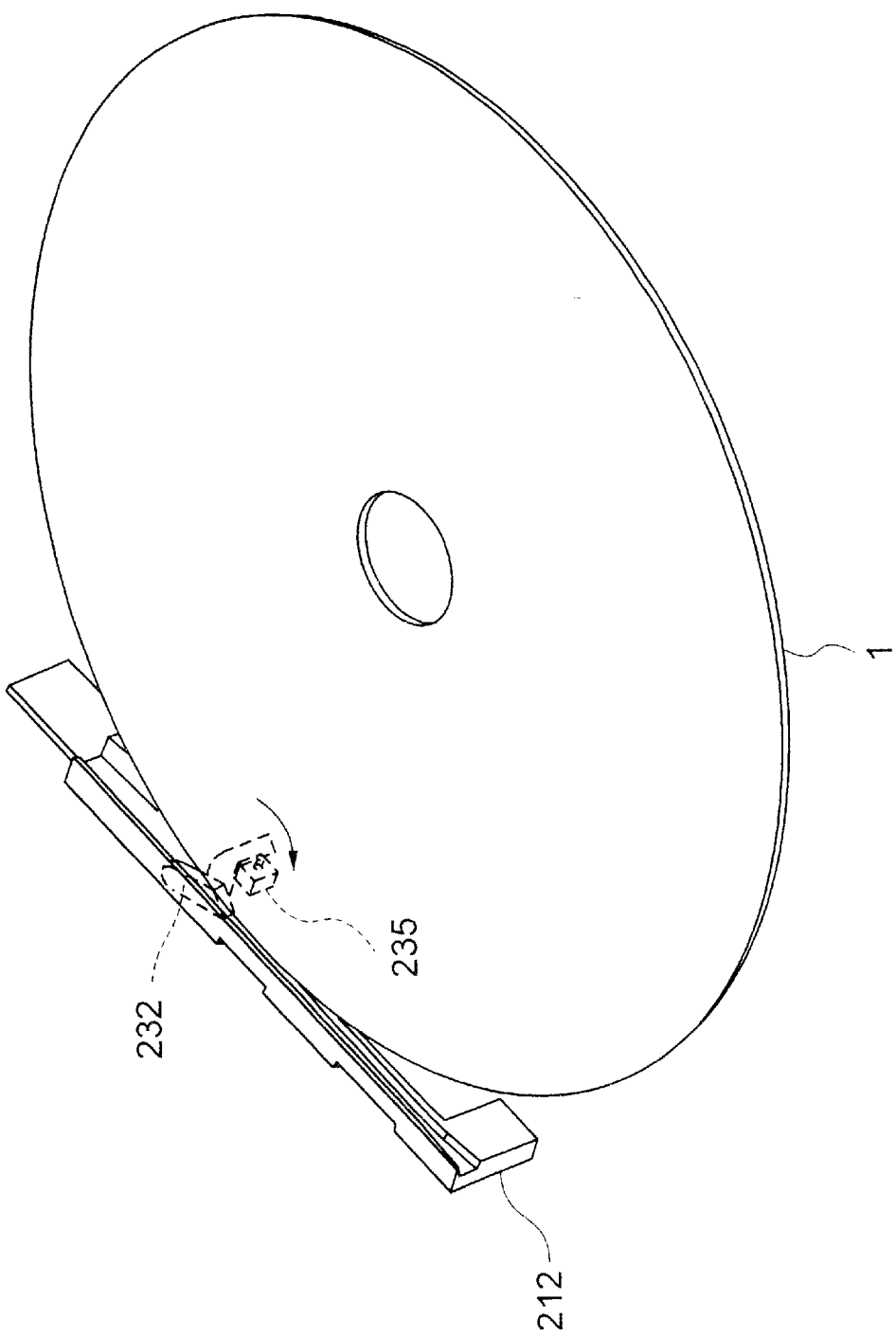
FIG. 20 is a perspective view which shows an operation state of an insertion detecting switch.

At first, the operator inserts the disc into the inserting port 453 provided in the vessel 452. The disc 1 moves forward to the inner portion of the disc drive apparatus along the grooves L212 and R222, as shown in FIG. 18. As shown in FIG. 18, the center hole of the disc 1 moves forward to the inserting port 453, and the disc 1 is inserted to the position where there is no fear that the finger of the operator is nipped, that is, the position necessary for transferring the disc 1 and sufficient for the safety of the finger of the operator (that is, the waiting position). Then, as shown in FIGS. 3, 19 and 20, the passage actuator 232 is arranged in the groove L212 at the position of insertion, the outer peripheral end surface of the disc presses the detecting lever 233, and further, the detecting lever 233 presses the insertion detecting switch 235 in a direction of an arrow, thereby detecting the insertion of the disc 1.

At this time, four medium drive means 340 and the positioning pin 381 wait in the state of a little rotating in the direction of taking in the disc from the position of the original point (the position of the completion of the discharge). That is, the ring gear 311 is in a state of about 20 degrees rotating in a counterclockwise direction (a direction of rotation in a state of frontward viewing FIG. 17, the same is applied to the following description) from the position of the original point. Each of four medium drive means 340 and the positioning pin 381 swings and waits in correspondence to the angle of rotation of the ring gear 311. The discharge arm 341 slightly swings to the back of the disc drive apparatus, and moves toward the position of the completion of the mounting from the position of the original point so as not to prevent the insertion of the disc 1 (so that the discharge pin 345 does not prevent the disc 1 from moving forward). The take-in arm 351 keeps an opening state till reaching the position of the original point, and waits in the open position so that the take-in spring 355 does not prevent the disc 1 from moving forward. Of course, all of the pressing arm 391, the shutter arm 461 and the positioning pin 381 maintain the positions of the original points.

When the control portion 440 detects the insertion of the disc 1, the control portion 440 starts energizing to the drive means 250 and the motor 251 starts rotating. The rotation of the motor 251 is transmitted to the drive gear 281 from the drive worm 253 via the gear train 261, and the ring gear 311 continuously rotates in a counterclockwise direction (the direction of taking in the disc) by the output gear 284. It means that the period of taking in the disc in FIG. 16 has passed during this time. As shown in FIG. 16, during the period of taking in the disc, the take-in arm 351 starts swinging. Then, the take-in spring 355 is brought into contact with the outer peripheral edge of the disc 1 and takes in the disc 1 to the back of the disc drive apparatus. At this time, the disc 1 is supported by three points due to the contact among the left and right grooves L212 and R222 and the take-in spring 355 so as to be transferred. Accordingly, since the recording surface of the disc 1 is not brought into contact therewith when transferring and driving the disc 1, there is no fear of injuring, and since the disc is supported by three supporting points when transferring with supporting the outer peripheral edge of the circular disc, it is possible to securely support and transfer the disc 1. On the other hand, the discharge arm 341 continuously moves toward the position of the completion of the mounting so as not to prevent the disc 1 from being transferred.

Further, as a significant characteristic, in the case that the disc drive apparatus is inclined in a lateral direction with respect to a forward moving direction of the disc 1 in the middle of the transfer mentioned above, the disc 1 is not affected by the incline of the disc drive apparatus since the disc 1 is supported by the left and right grooves L212 and R222. Further, in the case that the disc drive apparatus is inclined so that the inserting port 453 (refer to FIG. 18) is directed downward, since the disc 1 is supported by the contact of the take-in spring 355, the disc 1 is not affected by the incline. In this case, the swinging torque of the take-in arm 351 is simply increased at a degree of the weight of the disc 1. Further, in the case that the disc drive apparatus is inclined so that the inserting port 453 (refer to FIG. 18) is directed upward, the disc 1 is brought into contact with the take-in spring 355 or is apart from the contact of the take-in spring 355, slides along the left and right grooves L212 and R222 and is brought into contact with two positioning pins 381 mentioned below in correspondence to the degree of the incline. However, the disc 1 only moves forward prior to the transfer process, and as a result, is not affected by the incline. Accordingly, even when accidentally inclining the disc drive apparatus in the middle of the transfer process, it is possible to securely transfer the disc.

Figure 21:
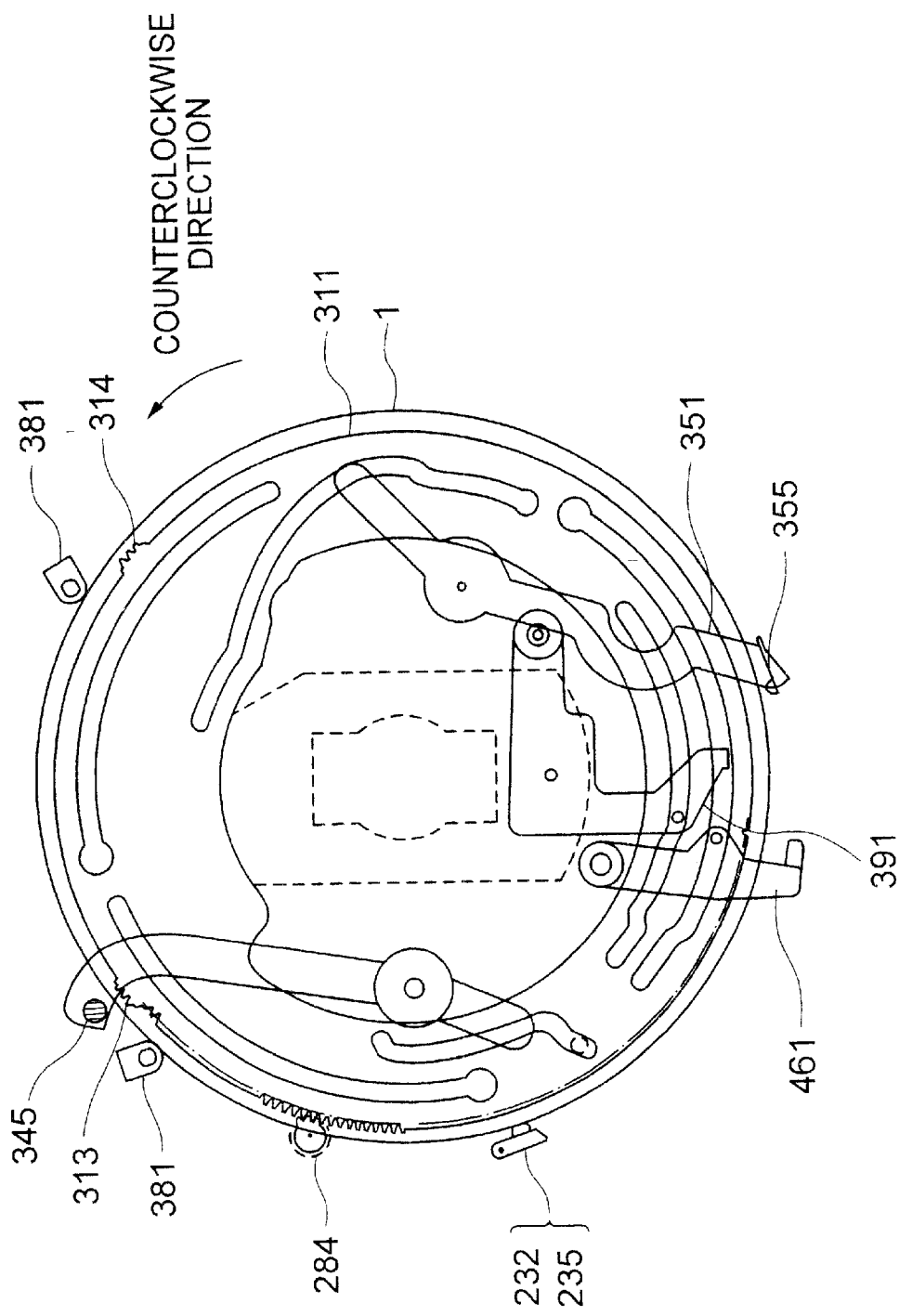
FIG. 21 is a view which shows a state that the disc reaches a position of a positioning pin.

The disc 1 transferred in this manner is finally brought into contact with the positioning pins 381 which waits in the transfer space, and stops. That is, it is the position of the positioning pin in FIG. 16. FIG. 21 is a view which shows a state that the disc reaches the position of the positioning pin, which corresponds to a state that the disc 1 moves forward to the back portion in FIGS. 17 and 18 and is brought into contact with the positioning pins 381. At this time, the take-in spring 355 of the take-in arm 351 presses the outer periphery of the disc 1, and at the same time, the outer periphery of the disc 1 is brought into contact with the thick cylindrical portion of the positioning portion 384 in the positioning pins 381. Accordingly, it is possible to position at three points by two positioning pins 381 and one take-in spring 355. Therefore, at a time of completing the forward movement of the disc 1, it is possible to accurately center the disc 1 by three points. Then, as mentioned above, since the position of the positioning pins 381 is set to the position at which the center of the disc 1 coincides with the center of the pick-up module 500, it is possible to more accurately and smoothly mount the next disc.

Figure 22:
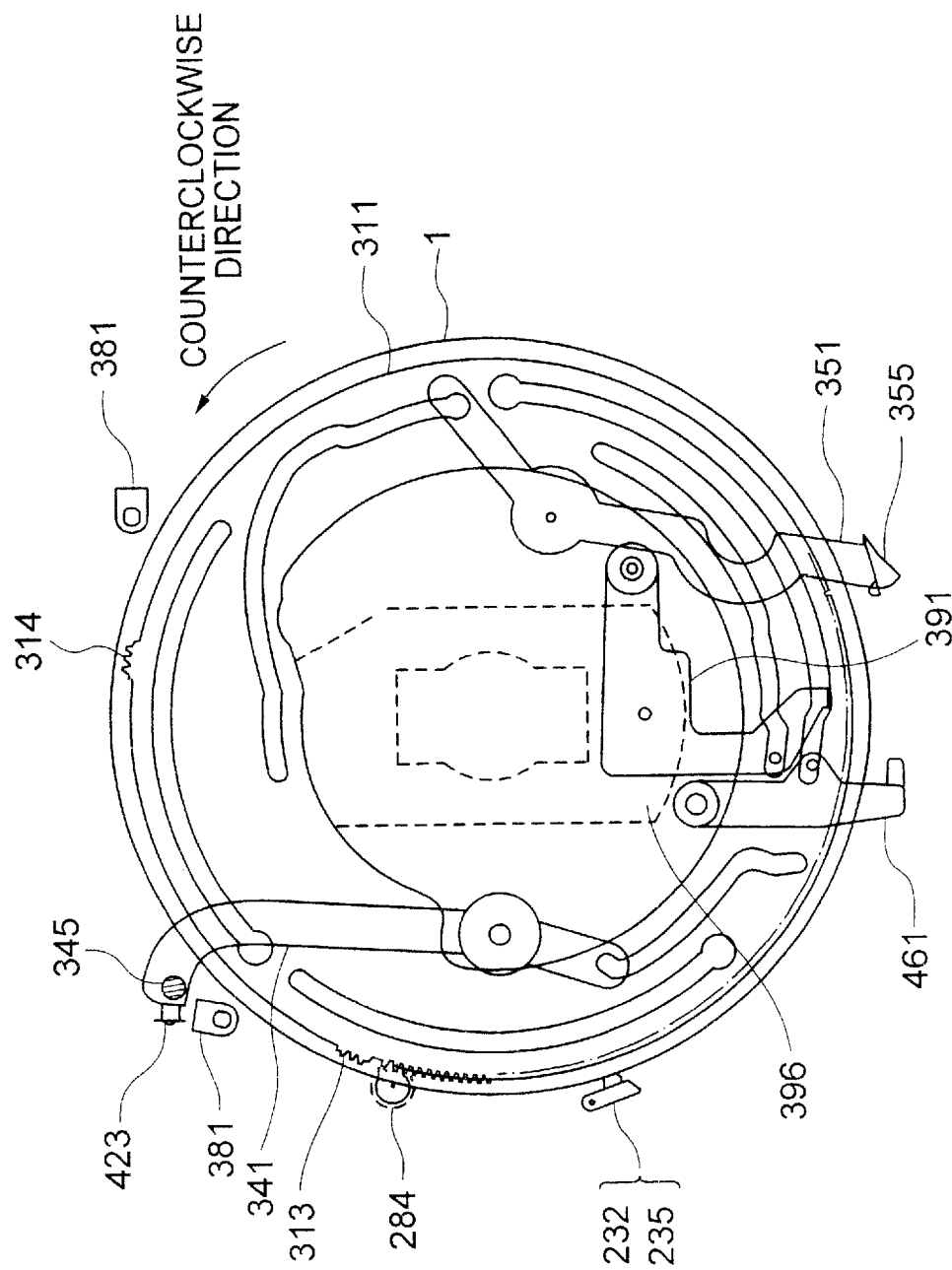
FIG. 22 is a view which shows a final position of a ring gear.

After the positioning is completed, the ring gear 311 continuously rotates in the counterclockwise direction. The mounting operation of the disc 1 is performed at this rotating process. Then, the ring gear 311 continuously rotates and finally reaches the final position. FIG. 22 is a view which shows the final position of the ring gear. In FIGS. 16 and 22, the discharge arm 341 does not perform the swinging operation from the position of the positioning pin to the position just prior to the final position. Because the disc 1 is not transferred and moved during the period between the positioning and the mounting. Then, the discharge arm 341 again starts swinging from the position just prior to the final position, and the discharge pin 345 presses the detecting switch 423 at the final position.

In the manner mentioned above, the control portion 440 detects the completion of the mounting of the disc 1 and stops energizing to the drive means 250, so that the motor 251 stops and the ring gear 311 also stop rotating. In this case, since the discharge arm 341 stops at the position of pressing the detecting switch 423, the detecting signal of the detecting switch 423 can be obtained during the period of mounting the disc 1 (including the period of performing the reproducing operation), as mentioned below.

The take-in arm 351 swings in a direction of moving apart from the disc 1 at the process of the mounting operation of the disc 1 after the take-in spring 355 presses the outer periphery of the disc 1 at the position of the positioning pin and maintains the position for a while together with the ring gear 311, so that the take-in spring 355 moves apart from the disc 1. Because it needs not for the take-in spring 355 to press the outer periphery of the disc 1 at a time of mounting the disc 1 to the rotating and driving means 551 after the positioning is completed.

The ring gear 311 passes through the position of the positioning pin and continuously rotates in the counterclockwise direction. Then, substantially at the same time when the take-in arm 351 swings in the direction of moving apart from the disc 1, the positioning gears A313 and B314 are meshed with the intermittent motion gear portion 383 of the positioning pins 381, so that the positioning pins 381 rotates at a predetermined angle and changes the direction thereof from the waiting position to the mounting position. As a result, the thin cylindrical portion of the positioning portion 384 is opposed to the outer periphery of the disc 1, and the positioning of the disc 1 is cancelled. Then, after the positioning pins 381 changes the direction thereof to the mounting position, the direction of the mounting position is maintained due to the function of the positioning spring 385 even after the engagement with respect to the ring gear 311 is removed.

Further, the pressing arm 391 performs a first swinging motion after the ring gear 311 passes through the position of the positioning pin and before the positioning pins 381 starts changing the direction thereof, the pressing arm 391 maintains the first swinging motion for a while and thereafter performs a second swinging motion after the take-in arm 351 and the positioning pins 381 are apart from the disc 1 as mentioned above. The point 394 of operation of the pressing arm has a first swinging stroke in the first swinging motion and has a second swinging stroke which is larger than the first swinging stroke in the second swinging motion. Accordingly, the pressing spring 396 performs a first pressing motion in the first swinging stroke and a second pressing motion which is larger than the first pressing motion in the second swinging stroke so as to move the surface of the disc 1 toward the pick-up module 500 (refer to FIG. 7).

That is, when the disc 1 reaches the position of the positioning pin, it performs the first pressing motion so as to start moving the take-in arm 351 and the positioning pins 381 apart from the disc 1. Then, after the take-in arm 351 and the positioning pins 381 are apart from the disc 1, it performs the second pressing motion having a large stroke so as to mount the disc 1 to the pick-up module 500. Further, when the disc 1 reaches the position of the positioning pin, the disc 1 is securely mounted to the pick-up module 500 due to the first and second pressing motions mentioned above since the;guide rails L211 and R221 are formed in a smooth inclined surface so as to be easily attached to and detached from the pick-up module 500 as mentioned above.

Figure 23:
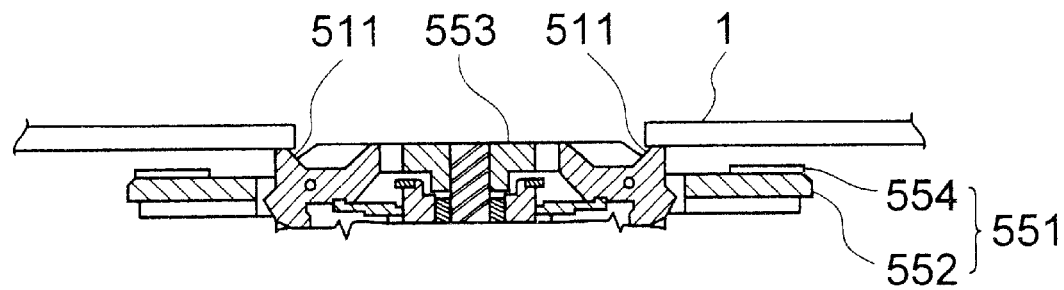
FIG. 23 is a view which explains an operation of mounting and fixing means.
Figure 23:
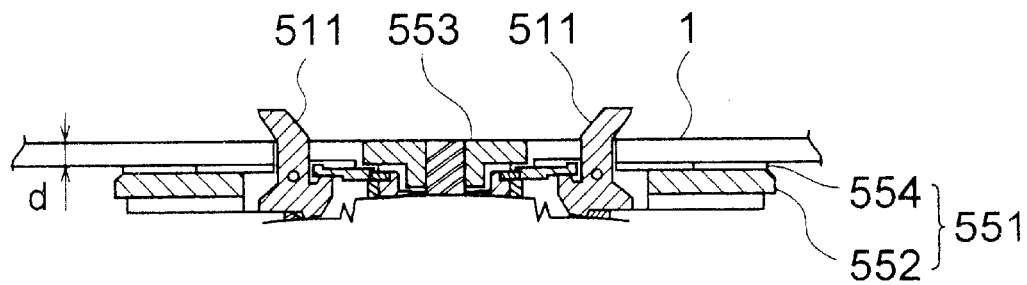
Figure 23:
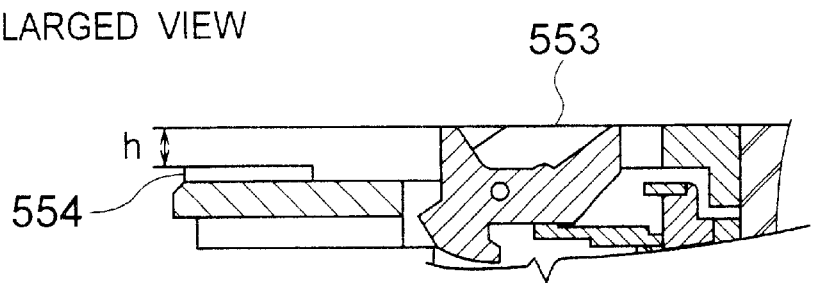

Further, a description will be given of an operation that the mounting and fixing means 511 provided in the pick-up module 500 mounts and fixes the disc 1 to the rotating and driving means 551 in the process of the second pressing motion. FIG. 23 is a view which explains an operation of the mounting and fixing means 511 and shows a cross section along a line Y—Y in FIG. 7. In FIG. 23, the rotating and driving means 551 is constituted by a turn table 552 on which mounts the disc 1, a center hub 553 which passes through the center hole of the disc 1 so as to center, and a slip sheet 554 which makes the disc 1 to follow to an acceleration of rotation of the turn table 552. The mounting and fixing means 511 rotates between a releasing position (refer to a step 1) and a fixing position (refer to a step 2) so as to mount, fix and release the disc 1.

When the disc 1 mentioned above reaches the position of the positioning pin, it is in a state shown in the step 1, the mounting and fixing means 511 waits at the releasing position, and the center of the disc 1 is positioned to a state of substantially coinciding with a center of the center hub 553. In the subsequent first pressing motion, the pressing spring 396 performs the first pressing motion. The pressing position corresponds to the pressing portion 397 shown in FIG. 7 mentioned above. Accordingly, the disc 1 moves along a tapered surface of the center hub 553 by being pressed by the pressing spring 396 on the disc surface and the take-in arm 351 and the positioning pins 381 starts moving apart from the disc 1 in a state of being supported by the mounting and fixing means 511.

Next, in the process of the second pressing motion, the state becomes in the state shown in the step 2. That is, the disc 1 is mounted to the pick-up module 500 by performing the second pressing motion having a large stroke after the take-in arm 351 and the positioning pins 381 move apart from the disc 1. At the same time, the mounting and fixing means 511 rotates to the fixing position so as to complete the mounting and the fixing of the disc 1. At this time, since the center of the disc 1 is previously positioned in the state of substantially coinciding with the center of the center hub 553, and the take-in arm 351 and the positioning pins 381 are apart from the disc 1, there is no resistance together with the movement of the disc 1. Further, the disc 1 is fixed to the center hub 553 due to the second pressing motion having a large stroke and the rotation of the mounting and fixing means 511 with keeping the state of being pressed by the pressing spring 396 while being centered along the tapered surface of the center hub 553.

Since the disc 1 is mounted and fixed in the manner mentioned above, the pressing spring 396 does not require a special pressing force. Further, the tapered surface of the center hub 553 does not require a special angle of incline and a special length of the inclined surface. The enlarged view shows the structure mentioned above, and shows a mounting height h of the disc 1 and a difference in height between the slip sheet 554 and the center hub 553. That is, the height h of the center hub 553 can be set to a height necessary for centering the disc 1, and can be set to be equal or less than the thickness d of the disc 1 in the embodiment in accordance with the present invention, as shown in the step 2. For example, since it is possible to set h=0.8 mm with respect to d=1.2 mm, it is possible to make the pick-up module 500 thin, thereby being useful for making the disc drive apparatus thin.

As mentioned above, since the surface of the disc 1 is pressed and urged in the direction of the pick-up module 500 due to the first and second pressing motions after being positioned in the process of being mounted to the pick-up module 500 from the guide rails L211 and R221, the disc 1 can be securely mounted to the pick-up module 500, for example, even when the note-book type personal computer having the disc drive apparatus in accordance with the present invention mounted is moved or inclined. Accordingly, it is possible to provide the disc drive apparatus which can be comfortably used by the operator.

Finally, substantially at the same time of this second pressing motion, the shutter arm 461 swings, and the shutter 457 closes the inserting port 453 of the vessel 452 due to the pressing and urging of the shutter cam 465. In the manner mentioned above, the disc 1 is mounted, fixed and prevented from being erroneously inserted, so that the disc drive apparatus performs a reproducing operation.

Next, the operator operates to discharge the presently mounted disc 1 when the reproduction is finished or the disc is required to be replaced. Then, the control portion 440 controls the rotation of the motor 251 so as to rotate the ring gear 311 from the state shown in FIG. 22 in the clockwise direction. As mentioned above, the operation along the inverse processes to those for mounting the disc mentioned above is performed. In FIG. 16, the state is inversely changed from the final position at the right end toward the position of the original point at the left end.

At first, the discharge arm 341 starts the swing motion toward the position of the original point, and temporarily stops the swing motion near the portion where the discharge pin 345 is just brought into contact with the outer periphery of the disc 1. Subsequently, while the pressing spring 396 performs the second pressing motion, the mounting and fixing means 511 releases the disc 1 from the rotating and driving means (the turn table) 551 and lifts up the disc 1 to the position of the grooves L212 and R222. Further, while the pressing spring 396 performs the first pressing motion, the take-in arm 351 is returned to the disc 1 and the take-in spring 355 is brought into contact with the outer periphery of the disc 1. Further, substantially at the same time, the positioning gears A313 and B314 which is rotated in the clockwise direction so as to be returned are again meshed with the intermittent motion gear portion 383 so as to rotate the positioning pins 381 to a predetermined angle and change the direction from the mounting position to the waiting position. As a result, the disc 1 is lifted up and again positioned, thereby securely guiding the disc 1 to the position of the grooves L212 and R222.

Figure 24:
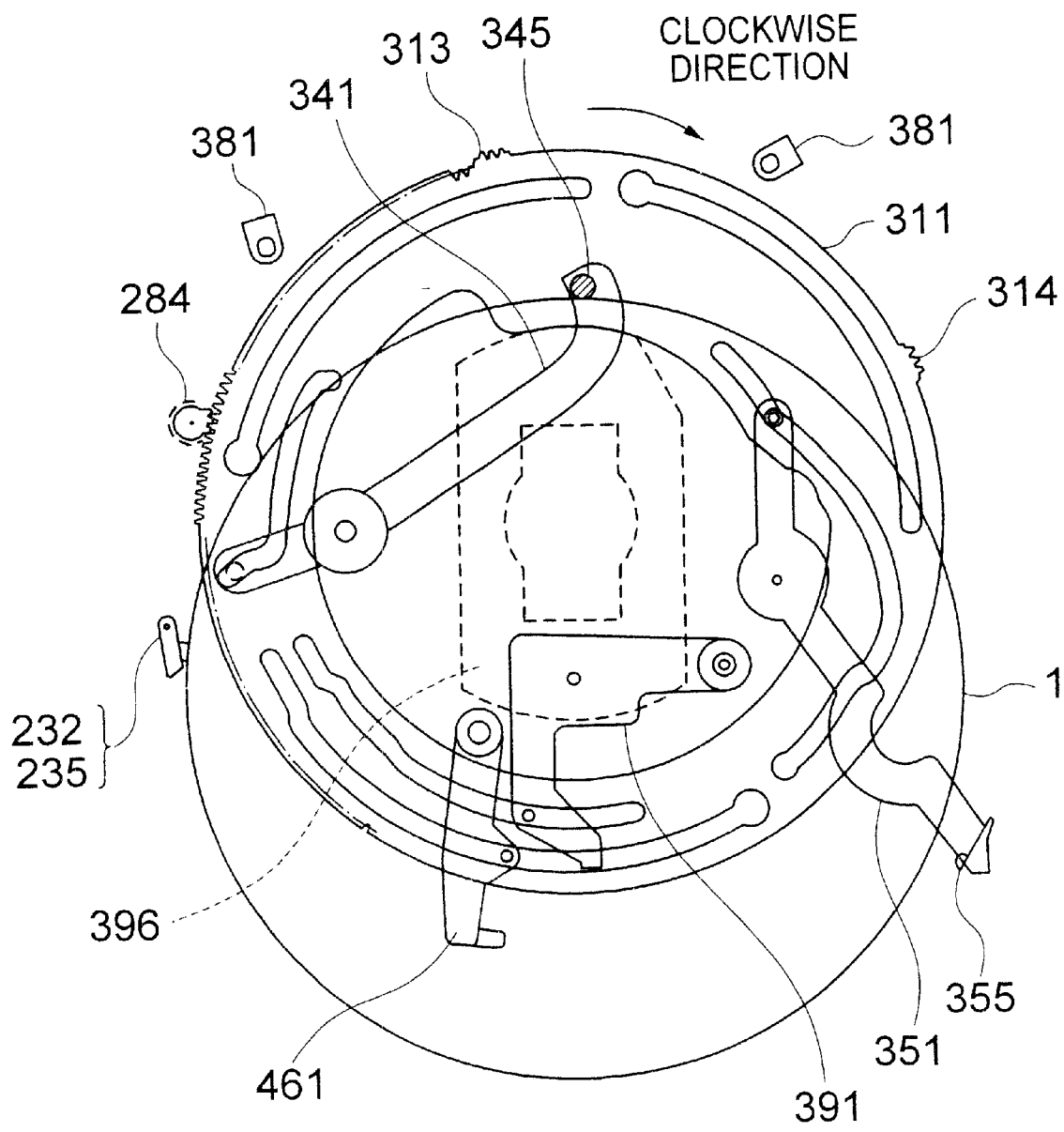
FIG. 24 is a view which shows a discharging and transferring state.

Subsequently, the take-in arm 351 again starts swinging toward the position of the original point together with the rotation in the clockwise direction of the ring gear 311, and the discharge arm starts swinging. toward the position of the original point in a little delayed manner. The disc 1 which is released and positioned to the position of the grooves L212 and R222 in the manner mentioned above is pressed by the discharge pin 345 on the outer periphery so as to be transferred toward the inserting port 453 along the grooves L212 and R222. FIG. 24 is a view which shows the discharging and transferring state, and shows the state of bring pressed by the discharge pin 345 on the outer periphery so as to be transferred near the waiting position.

In this case, since the motion of the disc 1 in the case of inclining the disc drive apparatus in the middle of being transferred toward the inserting port 453 is the same as the transferring process mentioned above and the discharge arm 341 only presses the disc 1 in place of the take-in arm 351, the overlapping description will be omitted.

Figure 25:
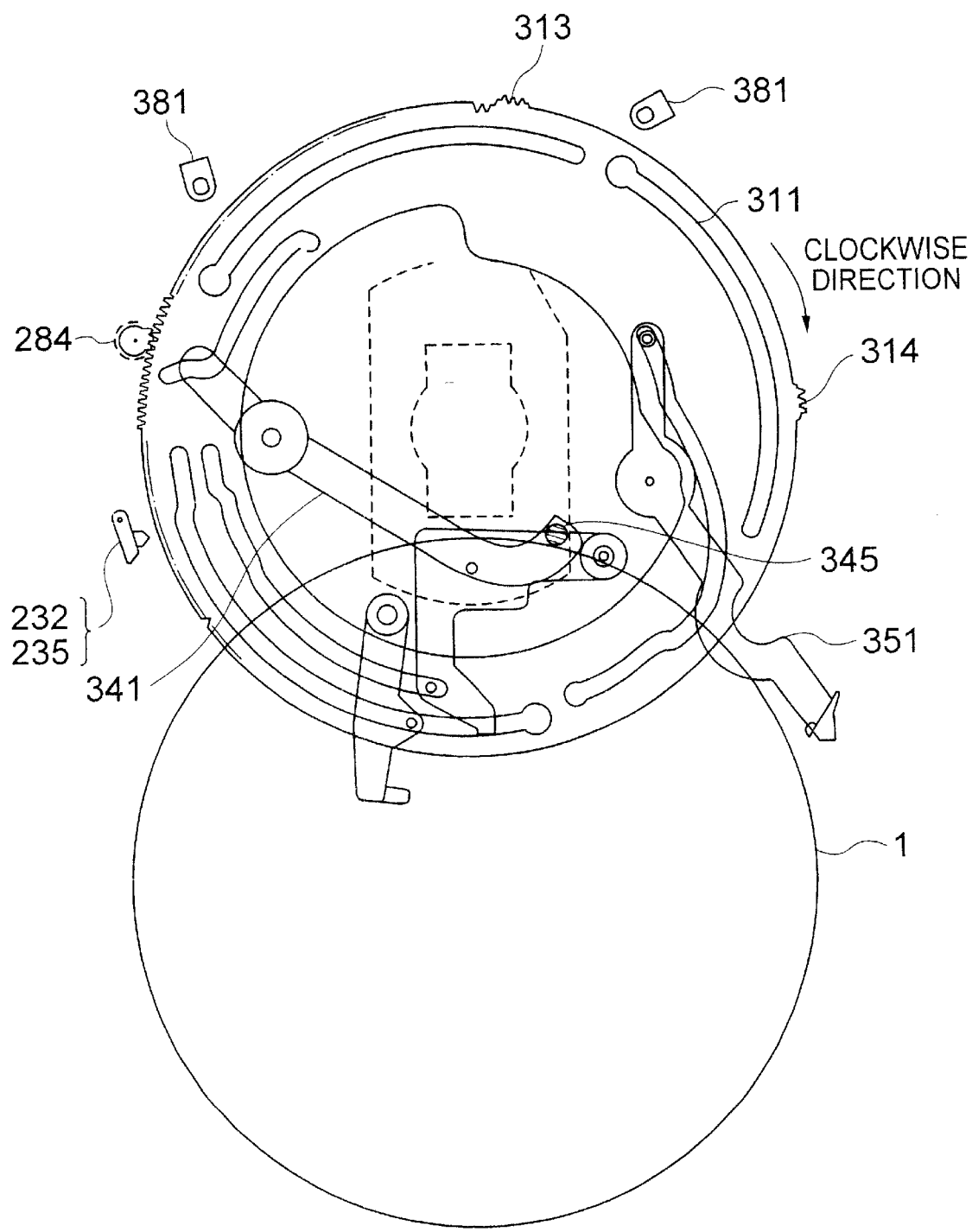
FIG. 25 is a view which shows a state that the disc is discharged to a position of an original point.

Again, in FIG. 16, when the ring gear 311 continuously rotates in the clockwise direction, it finally reaches the position of the original point. FIG. 25 is a view which shows a state that the disc 1 is discharged to the position of the original point. The discharge arm 345 swings in the direction of the inserting port at the maximum and the disc 1 is pressed by the discharge pin 345 on the outer periphery so as to be out of the inserting port. The take-in arm 351 is retracted further to the outer periphery from the disc 1 sofas not to prevent the disc 1 from passing. At this time, as explained in FIG. 11 mentioned above, the positioning gear B314 operates the original point switch 403 via the original point actuator 402, and the discharge detecting means 401 detects the completion of the discharge of the disc 1 and the arrival to the position of the original point.

When the control portion 440 detects the arrival to the position of the original point, it temporarily stops the motor 251, in sequence, inversely rotates it so as to rotate the ring gear 311 from the position of the original point in FIG. 16 to the waiting position in the counterclockwise direction, and prepares for the insertion of the next disc. In this case, the angle of rotation from the position of the original point to the waiting position is controlled by the control portion 440 by counting the signals of the encoder 271 described in FIG. 4 mentioned above.

In this case, it can be understood that in all the processes between the insertion of the disc 1 and the discharge thereof mentioned above, four medium drive means 340 do not overlap with each other and do not invade into the passing space for the disc 1. Further, since the function of the discharge arm 341 and the function of the take-in arm 351 are separated, the operating sequence and the transfer operation can be securely obtained even when the abnormal matter is generated in the middle of transferring the disc 1 (for example, the note-book type personal computer using the disc drive apparatus is suddenly inclined or the like). Further, since during the period that the mounting and fixing means 511 mounts, fixes and releases the disc 1, the pressing spring 396 performs the pressing operation, the pick-up means can securely mount, fix and release the disc 1.

Further, it can be understood that there is no process of moving the disc 1 in the direction perpendicular to the surface of the disc 1 and no transferring mechanism in all the process between the insertion of the disc 1 and the discharge thereof mentioned above. Accordingly, the operator performs all of the inserting, mounting, releasing and discharging processes only by inserting the disc into the inserting port in the disc drive apparatus, and the conventional mounting operation and the like by the operator are not required as mentioned above. That is, in accordance with the disc drive apparatus of the present invention, it is possible to construct the apparatus thin since the vertical moving mechanism and the front and back nipping mechanism for the disc are nor required. Further, since the mounting operation and the like by the operator are not required and all the processes between the insertion and the discharge can be performed by the disc drive apparatus, it is possible to provide the disc drive apparatus which can be easily operated by the operator.

Figure 26:
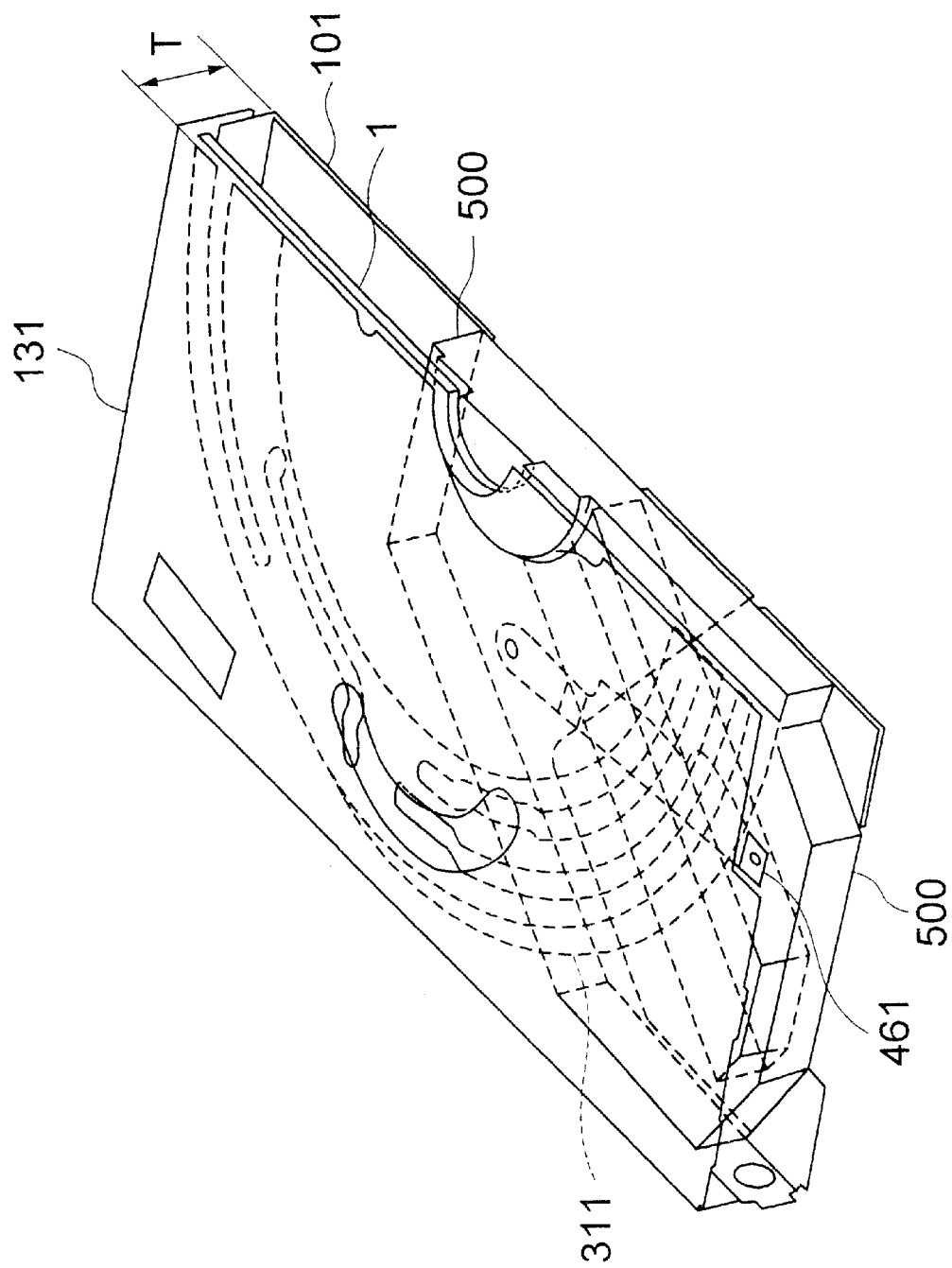
FIG. 26 is a cross sectional view along a line X—X in FIG. 1.

Next, FIG. 26 is a cross sectional view along a line X—X in FIG. 1. In comparison between FIGS. 1 and 26, it is apparent that the main elements occupied in the thickness T of the disc drive apparatus shown in FIG. 26 are only the pick-up module 500 and the thickness (the passing space) of the disc 1. This is because as described in FIGS. 1, 6 and 8, since the synchronous drive means 310 and the medium drive means 340 are formed by the thin steel plate and are structured such as to slide on the upper cover 131 so as to swing, it is possible to make the thickness of the synchronous drive means 310 and the medium drive means 340 thin as can be ignored with respect to the thickness of the whole of the disc drive apparatus. In addition, since the thickness of the pick-up module 500 is made about 8 mm, it is possible to set the thickness T of the whole of the disc drive apparatus in accordance with the present invention which employs the passing space for the disc 1, the synchronous drive means 310, the medium drive means 340 and the pick-up module 500 to the thin thickness equal to or less than 12.7 mm.

Further, since the outer diameter of the ring gear 311 is made equal to or slightly smaller than the disc 1, it is possible to make the space necessary for the drive means 250 and the projecting area smaller as can be ignore. Accordingly, it is possible to construct the plan projecting figure of the whole of the disc drive apparatus to a regular square which is circumscribed with the outer periphery of the disc 1.

As a result, it is possible to mount the disc drive apparatus to the note-book type computer which is required to be compact and thin, and it is possible to provide the disc drive apparatus which is convenient for the operator.

As mentioned above, in accordance with the present invention, since there is not required a special construction (for example, a chassis, a frame or the like) serving as the supporting mechanism, the construction is made simple and it is possible to obtain the structure suitable for making the apparatus thinner and more compact.

Further, since it is sufficient to move the disc along the disc surface from the position of supplying the disc to the position of rotating the disc, it is possible to omit the take-in and moving mechanism and the vertically moving mechanism and make the whole of the apparatus thin. Further, since it is not necessary for the operator to mount, fix and release by himself or herself, it is possible to obtain the disc drive apparatus which has a more comfortable operability.

Further, since the outer shape of the disc drive apparatus is made compact to substantially the same shape as the regular square which is circumscribed with the outer periphery of the disc, it is possible to provide the compact disc drive apparatus which can be mounted to the note-book type computer.

What is claimed is:

1. A disc drive apparatus comprising:

a pick-up which mounts, fixes and releases a disc and rotates the disc so as to reproduce a signal from the disc; and a disc transferer which transfers the disc supplied by an operator to said pick-up, wherein said disc transferer has a guide which supports the disc so as to move in a direction of a disc surface, a medium driver which transfers the disc in the direction of the disc surface, and a synchronous driver which drives said medium driver, wherein said medium driver comprises a plurality of components and said synchronous driver drives respective motions of said medium driver in a synchronous manner, a positioner which has two contact bodies, wherein when said medium driver transfers the disc so as to bring the outer periphery of the disc into contact with said positioner, said two contact bodies and said medium driver support three points on the outer periphery of the disc and said two contact bodies are arranged so that the center of the disc and the center of said pick-up substantially coincide with each other.

2. A disc drive apparatus comprising:

a pick-up which mounts, fixes and releases a disc and rotates the disc so as to reproduce a signal from the disc; and a disc transferer which transfers the disc supplied by an operator to said pick-up, wherein said disc transferer has a guide which supports the disc so as to move in a direction of a disc surface, a medium driver which transfers the disc in the direction of the disc surface, and a synchronous driver which drives said medium driver, wherein said medium driver has a first swinging member which is formed in a thin flat plate shape and swings in the direction of the disc surface so as to transfer the disc to an inner portion of the disc drive apparatus, and a second swinging member which is formed in a thin flat plate shape and swings in the direction of the disc surface so as to transfer the disc to an outer portion of the disc drive apparatus, wherein said synchronous driver drives respective motions of said medium driver in a synchronous manner, and wherein said synchronous driver is formed in a thin disc shape and is rotatably supported to a casing constituting an outer shell of the disc drive apparatus by three slidable fixing members.

3. A disc drive apparatus comprising:

a pick-up which mounts, fixes and releases a disc and rotates the disc so as to reproduce a signal from the disc;

a disc transferer which transfers the disc supplied by an operator to said pick-up; and a casing forming an outer shell, wherein said disc transferer has a guide which supports the disc so as to move in a direction of a disc surface, a plurality of medium drivers which swing in the direction of the disc surface so as to transfer the disc, and a synchronous driver which drives each of said plurality of medium drivers in a synchronous manner, and wherein said synchronous driver is rotatably supported to the casing which forms the outer shell.

4. A disc drive apparatus as claimed in claim 3, wherein said plurality of medium drivers has a first swinging member which is formed in a thin flat plate shape and swings in the direction of the disc surface so as to transfer the disc to an inner portion of the disc drive apparatus, a second swinging member which is formed in a thin flat plate shape and swings in the direction of the disc surface so as to transfer the disc to an outer portion of the disc drive apparatus, and a third swinging member which is formed in a thin flat plate shape and swings in the direction of the disc surface so as to press and urge the disc in the direction of said pick-up.

5. A disc drive apparatus as claimed in claim 4, wherein each of said first swinging member, said second swinging member and said third swinging member rotatably supports the center of the swing motion to said casing and slidably engages a point of force for swinging and driving with said synchronous driver, and wherein said synchronous driver is formed in a thin disc shape, and three guiding holes which are respectively engaged with said first swinging member, said second swinging member and said third swinging member and guide said point of force so as to swing and drive are respectively arranged in said synchronous driver.

6. A disc drive apparatus as claimed in any one of claims 3 to 5, wherein a first guiding hole, a second guiding hole and a third guiding hole which are respectively engaged with said first swinging member, said second swinging member and said third swinging member and guide said point of force so as to swing and drive are respectively arranged in said synchronous driver, and said synchronous driver has a first gear portion having an addendum circle as a substantial-outer periphery of said synchronous driver, and a second gear portion having a deddendum circle as a substantial outer periphery of said synchronous driver.

7. A disc drive apparatus comprising:
a pick-up which mounts, fixes and releases a disc and rotates the disc so as to reproduce a signal from the disc;
a disc transferer which transfers the disc supplied by an operator to said pick-up;
a first driver which transfers said disc transferer; and
a casing which forms an outer shell,
wherein said casing has a first casing which constitutes an upper portion and a second casing which constitutes a lower portion, said disc transferer is supported by said first casing and said first driver is arranged in said second casing,
wherein said disc transferer has a guide which supports the disc in such a manner as to move the disc in the direction of the disc surface, a plurality of medium drivers which swing in the direction of the disc surface so as to transfer the disc, and a synchronous driver which drives said plurality of medium drivers in a synchronous manner,
wherein said guide is fixed to said second casing,
wherein said synchronous driver is rotatably supported to said first casing,
wherein a center of swing motion of each of said plurality of medium drivers is rotatably supported to said first casing, and
wherein a point of force for each of the swing motions is slidably engaged with said synchronous driver.

8. A disc drive apparatus as claimed in claim 7, wherein said first driver has a motor, a reduction gear train and an output gear,
wherein said output gear integrally forms a driven gear which is meshed with said reduction gear train, a connecting portion which is extended in an axial direction of said driven gear, and an output portion which rotates said synchronous driver, and
said first driver is arranged in said second casing and said connecting portion is stood from said second casing toward said first casing.

9. A disc drive apparatus as claimed in one of claims 7 and 8, wherein when bonding said first casing with said second casing, said output portion is engaged with said synchronous driver and forms an outer shell of the disc drive apparatus.

10. A disc drive apparatus comprising:
a pick-up which mounts, fixes and releases a disc and rotates the disc so as to reproduce a signal from the disc; and
a disc transferer which transfers the disc supplied by an operator to said pick-up,
wherein said disc transferer has a guide which supports the disc so as to move in a direction of a disc surface, a plurality of medium drivers which transfers the disc, a presser which presses and urges the disc in the direction of the pick-up, and a synchronous driver which drives said medium driver and said presser in such a manner as to synchronize each of motions thereof,
wherein said medium driver has a first swinging member which is formed in a thin flat shape and swings in the direction of the disc surface so as to transfer the disc to an inner portion of the disc drive apparatus, and a second swinging member which is formed in a thin flat shape and swings in the direction of the disc surface so as to transfer the disc to an outer portion of the disc drive apparatus,
said presser has a third swinging member which is formed in a thin flat shape and swings in the direction of the disc surface, and a pressing member which is engaged with said third swinging member and is supported so as to be bent,
wherein said pressing member is structured such that an end thereof is fixed to the casing so as to be arranged in the center portion of the disc and another end is engaged with said third swinging member, and
wherein said presser is pressed by said third swinging member due to the swinging motion of said third swinging member so as to be bent and projected in the direction of said pick-up, and is pulled by said third swinging member so as to be extended in a flat surface shape.

11. A disc drive apparatus comprising:
a pick-up which mounts, fixes and releases a disc and rotates the disc so as to reproduce a signal from the disc; and
a disc transferer which transfers the disc supplied by an operator to said pick-up,
wherein said disc transferer has a guide which supports the disc so as to move in a direction of a disc surface, a plurality of medium drivers which transfers the disc, a presser which presses and urges the disc in the direction of the pick-up, and a synchronous driver which drives said medium driver and said presser in such a manner as to synchronize each of motions thereof,
wherein said medium driver has a first swinging member which is formed in a thin flat shape and swings in the direction of the disc surface so as to transfer the disc to an inner portion of the disc drive apparatus, and a second swinging member which is formed in a thin flat shape and swings in the direction of the disc surface so as to transfer the disc to an outer portion of the disc drive apparatus,
said presser has a third swinging member which is formed in a thin flat shape and swings in the direction of the disc surface, and a pressing member which is engaged with said third swinging member and is supported so as to be bent,
wherein the disc supplied by the operator is transferred in the direction of the disc surface in a state that the outer periphery of the disc is supported by said guide and the outer periphery of the disc is pressed by said first swinging member or said second swinging member, and
wherein when moving between said disc transferer and the pick-up, the disc is mounted and released in a state that the outer periphery of the disc is supported by said guide and an inner peripheral portion of the disc is pressed by said pressing member.

12. A disc drive apparatus comprising:

pick-up means which mounts, fixes and release a disc and rotates the disc so as to reproduce a signal from the disc; and disc transfer means which transfers the disc supplied by an operator to said pick-up means, wherein said disc transfer means has guiding means which supports the disc so as to move in a direction of a disc surface, a plurality of medium driving means which transfers the disc in the direction of the disc surface, synchronous driving means which drives said medium driving means in such a manner as to synchronize each of motions of said medium driving means, and positioning means which is brought into contact with the outer periphery of the disc, and said positioning means includes two contact bodies, and said two contact bodies are arranged so that three points on the outer periphery of the disc are supported by said two contact bodies and said medium driving means when transferring the disc by said medium driving means so as to bring the outer periphery of the disc into contact with said positioning means and the center of the disc and the center of said pick-up means substantially coincide with each other.

13. A disc drive apparatus as claimed in claim 12, wherein said synchronous driving means rotates and drives said positioning means, and operates so that said two contact bodies move apart from the outer periphery of the disc after said two contact bodies and said medium driving means support three points on the outer periphery of the disc, due to the drive operation of said synchronous driving means.

14. A disc drive apparatus as claimed in claim 12 or 13, wherein said medium driving means has pressing means which is formed in a thin flat shape and swings in the direction of the disc surface so as to press and urge the disc to a direction of the pick-up means, and said pressing means presses and urges the disc when said two contact bodies and said medium driving means move apart from the outer peripheral edge of the disc due to the driving motion of said synchronous driving means.

15. A disc drive apparatus as claimed in any one of claims 1, 2, 3, 7, 10, 11, and 12, wherein said pick-up and said disc transferer are provided and a thickness of a whole of the apparatus is 12.7 mm or less.

16. A disc drive apparatus as claimed in any one of claims 1, 2, 3, 7, 10, 11, and 12, wherein a horizontal width of the disc drive apparatus projected in the direction of the disc surface is 131 mm or less and a depth thereof is 135 mm or less.

* * * * *